(12) United States Patent
Shimizu et al.

(10) Patent No.: US 8,510,316 B2
(45) Date of Patent: Aug. 13, 2013

(54) DATABASE PROCESSING SYSTEM AND METHOD

(75) Inventors: Akira Shimizu, Kokubunji (JP); Kazutomo Ushijima, Fuchu (JP); Seisuke Tokuda, Hachioji (JP); Michiko Tanaka, Kokubunji (JP); Shinji Fujiwara, Sagamihara (JP); Nobuo Kawamura, Atsugi (JP)

(73) Assignee: Hitachi, Ltd., Tokyo (JP)

( * ) Notice: Subject to any disclaimer, the term of this patent is extended or adjusted under 35 U.S.C. 154(b) by 478 days.

(21) Appl. No.: 12/543,826

(22) Filed: Aug. 19, 2009

(65) Prior Publication Data

US 2010/0211577 A1 Aug. 19, 2010

(30) Foreign Application Priority Data

Feb. 13, 2009 (JP) .................................. 2009-31190

(51) Int. Cl.
*G06F 7/24* (2006.01)
(52) U.S. Cl.
USPC ........... 707/752; 707/705; 707/748; 370/327; 370/328; 715/790
(58) Field of Classification Search
USPC ................................................ 707/705–789
See application file for complete search history.

(56) References Cited

U.S. PATENT DOCUMENTS 7,729,259 B1 * 6/2010 Faulkner et al. ............... 370/236
2007/0226193 A1 * 9/2007 Todaka ............................ 707/3

FOREIGN PATENT DOCUMENTS

JP 2007-34414 A 2/2007

OTHER PUBLICATIONS

H. Garcia-Molina et al., Database System Implementation, Prentice Hall, 1999, pp. 258, 417-418.

* cited by examiner

*Primary Examiner* — Tony Mahmoudi
*Assistant Examiner* — Tuan-Khanh Phan
(74) *Attorney, Agent, or Firm* — Mattingly & Malur, PC

(57) ABSTRACT

Provided is a database system in which sorting of query results is sped up. The database system stores storage location information in which storage locations of the pieces of data are recorded in a given order. When there is no second task, which is executed based on data that is fetched in a first task, whether every piece of data requested in a third task, which is executed before the first task, has been fetched is determined. In the case where every piece of data requested in the third task has been fetched, data fetched in the first task is output. In the case where some of the data requested in the third task has not been fetched, data fetched in the first task is kept in a temporary buffer until every piece of data requested in the third task is fetched, and then output.

13 Claims, 16 Drawing Sheets

【 TABLE AND INDEX DEFINITION EXAMPLE 】
create table part (Name char(5), Brand char(5), PID int)  ~301
create table lineitem(PID int, LineID int, OID int)  ~302
create index part_index on part (Name, PID)  ~303
create index lineitem_index on lineitem (PID, LineID)  ~304

305

【 QUERY EXAMPLE 】
select *
from part, lineitem
where part.PID=lineitem.PID and part.Brand="abc"
order by part.Name, lineitem.LineID

DATABASE PROCESSING SYSTEM AND METHOD

CLAIM OF PRIORITY

The present application claims priority from Japanese patent application JP 2009-031190 filed on Feb. 13, 2009, the content of which is hereby incorporated by reference into this application.

BACKGROUND OF THE INVENTION

This invention relates to a technology of fetching data from a database, and more particularly, to a technology of fetching sorted data.

The emergence of Radio Frequency Identification (RFID) has contributed to the recent rapid increase in scale of databases that store transaction data, traceability data, and the like. The need for a way to quickly search such a large-scale database is stronger than ever.

Systems for searching a large-scale database fast include database processing systems that issue data input requests in a multiplex manner to secondary storage. The database processing systems are designed around input/output (I/O) processing to and from secondary storage which constitutes most of query processing, and shorten processing time by issuing data input requests in a multiplex manner to the secondary storage (see, for example, JP 2007-34414 A).

A database processing system disclosed in JP 2007-34414 A creates a task for fetching data each time data is required and, when the created task is executed, issues a data input request as needed. A plurality of tasks that require data input are processed in parallel, and data input requests are consequently issued in a multiplex manner to secondary storage.

In the database processing systems, tasks are processed in the order in which their data input requests are fulfilled. The database processing systems are characterized in that, with data input requests issued in a multiplex manner to secondary storage, the order in which the data input requests are fulfilled usually varies each time processing is executed, thus varying the order in which query results are generated each time. Unless a particular order in which query results are output is specified, it can be confirmed that query results are output in a different order each time processing is executed.

Another way to accomplish fast search is a technology developed around sort processing of query processing. Sort processing is used to arrange query results in a specific output order, or as preprocessing for aggregation of query results. The search speed enhancing technology developed around sort processing is important as well because a larger database scale means increased sort processing cost.

Sort cancel is a known search speed enhancing technology developed around sort processing. Database processing systems commonly have an access method which reads data in a specific order. For instance, in the case where an index is used in order to retrieve data with a few data input requests, data can be accessed in the order of index keys. In the case of a clustered table, data in the table can be accessed in the order of cluster keys. These utilize a data reading order ensured by the access method, to thereby avoid subsequent sort processing. Another advantage of sort cancel is that, with sort processing excluded from the search operation, a query result can be output before the reading of all data to be read is finished. This is particularly effective for top-k query processing in which only the first k hits are retrieved. Details of sort cancel are described in Hector Garcia-Molina, "Database System Implementation", Prentice Hall, 1999, pp. 258, 417-418.

SUMMARY OF THE INVENTION

A problem is that sort cancel cannot be applied to a database processing system that issues data input requests in a multiplex manner to secondary storage. Specifically, in this type of database processing system, an access method capable of reading data in a specific order can only ensure the order in which data input requests are issued whereas the data input requests are fulfilled in a different order each time processing is executed and, consequently, the order in which query results are generated is not ensured. Arranging query results in a specific output order or executing preprocessing for aggregation of query results therefore requires sort processing that is performed on all query results.

This invention has been made in view of the above, and it is therefore an object of this invention to obtain query results in a specified output order without performing sort processing on all query results in a database processing system that issues data input requests in a multiplex manner to secondary storage.

The representative aspects of this invention are as follows. That is, there is provided a database processing system, comprising: a computer which outputs all query results in response to query requests received from outside; and a storage system which stores data to be output in accordance with the query requests, wherein the computer comprises a first interface, which is coupled to the storage system, a processor, which is coupled to the first interface, and a memory, which is coupled to the processor, wherein the storage system comprises a second interface, which is coupled to the computer, a control unit, which is coupled to the second interface, and storage, which is coupled to the control unit, wherein the storage stores the data and storage location information in which storage locations of the data are recorded in a given order, wherein the computer is configured to: receive query requests for outputting query results in an order of values recorded in the storage location information; store order relations of the values recorded in the storage location information in association with a plurality of data input requests for fetching the data in accordance with the query requests; and send the plurality of data input requests to the storage system, wherein the storage system is configured to send data that is fetched in accordance with the each of the plurality of received data input requests to the computer for each of the plurality of data input requests received from the computer, and wherein the computer is configured to: determine, before all of the plurality of data input requests sent are fulfilled, from the order relations whether or not a query result to be output next is found in already fetched partial data, which is only part of the pieces of data to be fetched by the storage system; and start, in the case where the data to be output next is found, outputting the query result.

According to an aspect of this invention, query results can be obtained in a specified output order without performing sort processing on all query results.

BRIEF DESCRIPTION OF THE DRAWINGS

The present invention can be appreciated by the description which follows in conjunction with the following figures, wherein.

DETAILED DESCRIPTION OF THE PREFERRED EMBODIMENTS

Embodiments of this invention are described below with reference to the drawings. This invention is applied to a database processing system capable of issuing data input requests in a multiplex manner to secondary storage.

For example, if database processing systems are to be classified into parallel databases which run on a plurality of processes and single databases which run on a single process, this invention is applicable to single databases that issue data input requests in a multiplex manner to secondary storage.

Parallel databases include shared-everything databases and shared-nothing databases. Shared-everything parallel databases have an access method capable of reading data in a specific order that is consistent throughout the system, which means that sort cancel is possible. This invention is therefore applicable to shared-everything parallel databases.

Shared-nothing parallel databases, on the other hand, do not have an access method capable of reading data in a specific order that is consistent throughout the system, which means that sort cancel of the overall system is not possible. However, shared-nothing parallel databases have an access method that reads data in a specific order out of each database segment separately, and sort cancel is possible in each database segment. This invention is accordingly applicable to shared-nothing parallel databases that can issue data input requests in a multiplex manner to secondary storage on a database segment basis.

First Embodiment

Figure 1:
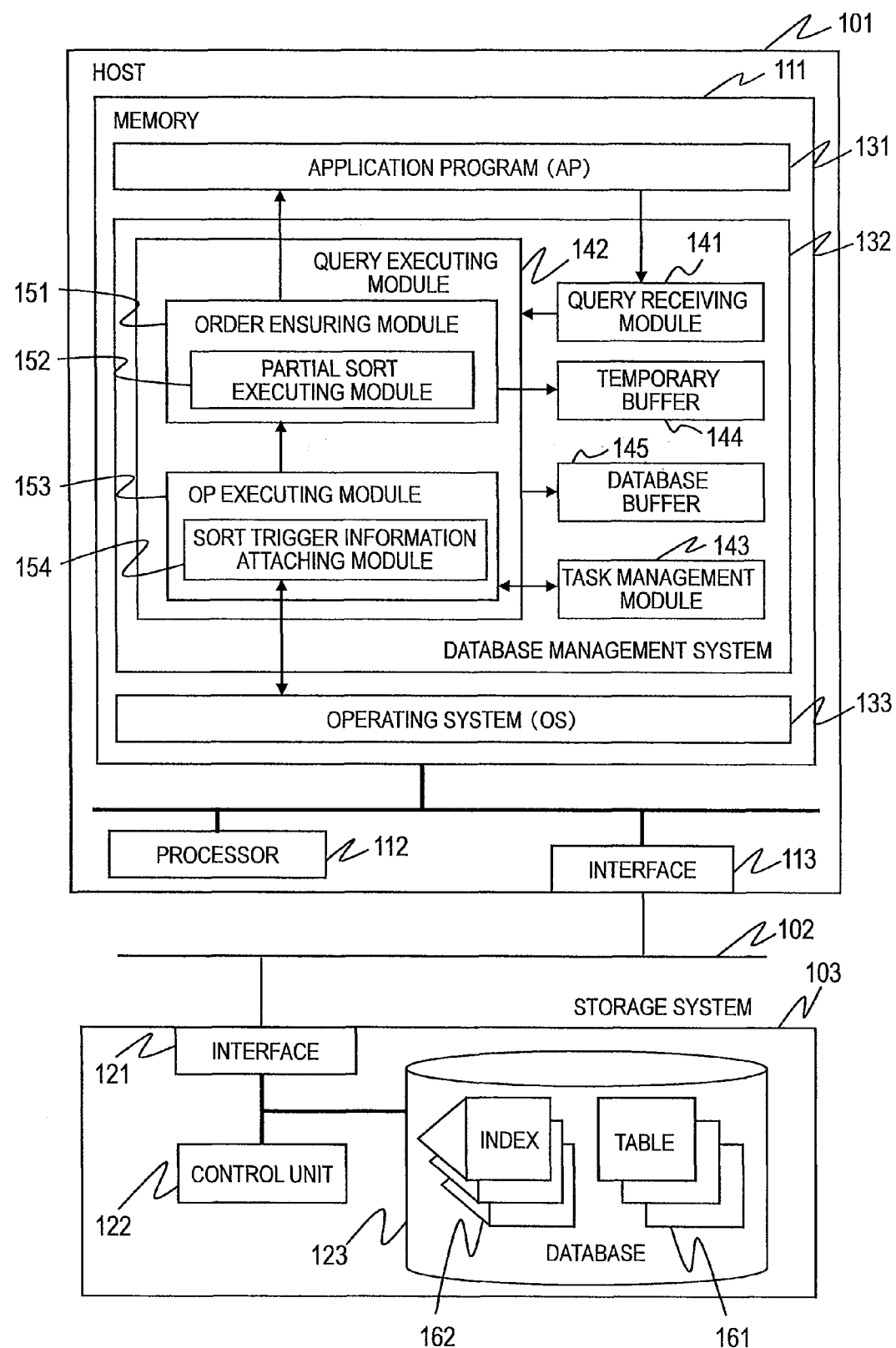
FIG. 1 is a block diagram illustrating a configuration of a computer system according to a first embodiment of this invention.

FIG. 1 is a block diagram illustrating a configuration of a computer system according to a first embodiment of this invention.

The computer system according to the first embodiment of this invention includes a host 101 and a storage system 103. The host 101 and the storage system 103 are coupled to each other via a network 102.

The host 101 executes a database management system 132, which is a program for managing data in the storage system 103, to process a query request made by an application program within the host 101 or by a client computer (not shown), and to send a query result in response.

The host 101 includes a memory 111, a processor 112, and an interface 113. The memory 111 stores the database management system 132 and other programs, and data necessary to execute the programs. The processor 112 executes various types of processing by running the programs that are stored in the memory 111.

The interface 113 allows connection to the network 102 to communicate with the storage system 103. In the case where the network 102 is a storage area network (SAN), the interface 113 may be a host bus adapter (HBA). When a program stored in the memory 111 is executed, an input/output request is issued to the storage system 103 via the interface 113 as needed.

The network 102 is, for example, a storage area network (SAN) to which the fibre channel (FC) protocol is applied, or alternatively may be any other type of network. Specifically, the network 102 may be an Internet protocol (IP) network that uses the iSCSI protocol employed for communication between the host 101 and the storage system 103.

The storage system 103 stores data read and written by the host 101, and executes data write or data read in accordance with an input/output request sent from the host 101.

The storage system 103 includes an interface 121, a control unit 122, and storage 123. The interface 121 is coupled to the network 102. The control unit 122 processes an input/output request sent from the host 101.

The storage 123 stores data read and written upon an input/output request. The storage 123 may be a hard disk drive (HDD), an optical disk drive, a semiconductor memory, or other types of storage. The storage system 103 of FIG. 1 includes a single piece of storage 123, but may include as many pieces of storage 123 as desired. In the case where the storage system 103 includes a plurality of pieces of storage 123, the pieces of storage 123 may form a disk array.

Programs stored in the memory 111 include an application program (AP) 131, the database management system 132, and an operating system (OS) 133.

The AP 131 issues a query request to the database management system 132, and receives a query result. The AP 131 is executed on the same computer that runs the database management system 132 in the first embodiment of this invention, but may be executed on another computer that is coupled via a network.

The database management system 132 searches the storage system 103 for data that meets a condition specified in a query request, and sends a search result (query result) to the issuer of the request. An index 162 for efficient access to data (table 161) is stored in the storage 123 of the storage system 103.

The database management system 132 is a relational database management system (RDBMS), which is based on a relational model, or an object-oriented database management system, which is based on an object model.

The RDBMS stores data called a record in the table 161, and has the index 162, which reduces the number of I/O requests required to access a record. The data structure of the index 162 is B-tree or hash. A query about data is written in Structured Query Language (SQL). In SQL, an "order by" clause is used to specify a query result output order, and aggregation is expressed with the use of a "group by" clause.

The database management system 132 according to the first embodiment of this invention stores the table 161 and the index 162 in the storage system 103, which is coupled to the host 101 via the network 102. The table 161 and the index 162 may be stored in storage within the host 101 in the case where the host 101 is provided with storage.

The OS 133 is a program for managing resources (processor 112 and memory 111) of the host 101. The OS 133 also receives an input/output request from the database management system 132, and issues the input/output request to the storage system 103.

To describe the configuration of the database management system 132 in more detail, the database management system 132 includes a query receiving module 141, a query executing module 142, a task management module 143, a temporary buffer 144, and a database (DB) buffer 145.

The query receiving module 141 creates a query plan based on a query request made by the AP 131. The query plan is described later.

The query executing module 142 executes the query plan created by the query receiving module 141. The query executing module 142 includes a basic database operation (hereinafter referred to as "OP") for generating a query result. A query plan is a processing procedure in which OPs necessary for generating a result that is requested by a query are combined. The query executing module 142 includes an OP executing module 153 and an order ensuring module 151.

The task management module 143 manages a task for executing a query plan.

The temporary buffer 144 is a space allocated to temporarily store partial query results. The database buffer 145 stores data that is cached for speeding up data access.

The OP executing module 153 creates a plurality of tasks for executing a query plan, and generates a query result by executing the created tasks. The tasks are executed in parallel, whereby data input requests are issued in a multiplex manner to the storage system 103 via the OS 133.

The OP executing module 153 includes a sort trigger information attaching module 154. The sort trigger information attaching module 154 creates sort trigger information based on such information as OPs to be processed and the order in which fetched data is obtained. The sort trigger information is information for sorting data read for each data input request based on the hierarchical structure of query processing, the index order, and the like. The created sort trigger information is attached along with an interim result, which is the intermediate stage of a query result. Specific contents of sort trigger information according to the first embodiment of this invention are described later with reference to FIG. 7.

The order ensuring module 151 is a module that rearranges the output order of query results into a specific output order. In the case where query results are to be output in a specific order to the AP 131, the order ensuring module 151 outputs the query results to the AP 131. In the case where the order ensuring module 151 is utilized in preprocessing for aggregation of query results, the order ensuring module 151 outputs the query results to the OP executing module 153 in some cases.

The order ensuring module 151 includes a partial sort executing module 152. The partial sort executing module 152 sorts some of the query results in accordance with sort trigger information that is attached to the query results and sort trigger information that indicates the end of a specific OP.

Figures 2, 3A, 3B:
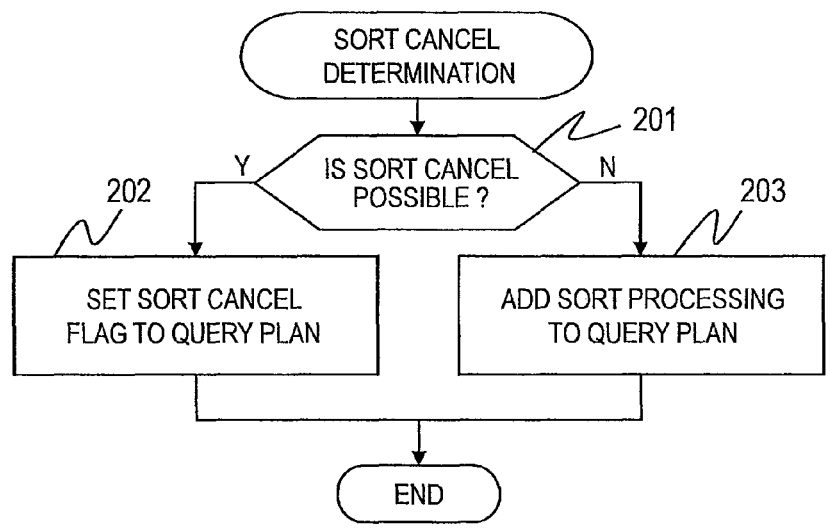
FIG. 2 is a flow chart illustrating steps that are executed by a query receiving module to determine sort processing according to the first embodiment of this invention.
FIG. 3A is a diagram illustrating SQL statements by which a table and an index are defined to illustrate a specific example of the first embodiment of this invention.
FIG. 3B is a diagram illustrating an example of an SQL statement for data search according to the first embodiment of this invention.

FIG. 2 is a flow chart illustrating steps that are executed by the query receiving module 141 to determine sort processing according to the first embodiment of this invention.

This processing is for determining in the query receiving module 141 whether to add sort processing to a query plan. Sort processing is added to a query plan in the case where a query result output order is specified in a received query request, or in the case where a received query result includes aggregation processing.

When the query receiving module 141 receives a query request, the processor 112 first determines whether or not sort cancel is possible (Step 201). How to determine whether sort cancel is possible or not is described in detail with reference to FIG. 4.

In the case where sort cancel is possible (the outcome of Step 201 is "Y"), the processor 112 sets to a query plan a sort cancel flag, which indicates that sort cancel has been performed instead of adding sort processing to the query plan (Step 202).

On the other hand, in the case where sort cancel is not possible (the outcome of Step 201 is "N"), the processor 112 adds sort processing to the query plan (Step 203).

To give a more specific description, an example of a query plan where sort cancel is possible is described with reference to FIGS. 3A and 3B and FIG. 4. In the example described here, the database management system 132 is an RDBMS. Details of the database operation of an RDBMS can be found in the above-described "Database System Implementation" and other documents.

FIG. 3A is a diagram illustrating SQL statements by which a table and an index are defined to illustrate the specific example of the first embodiment of this invention.

As illustrated in FIG. 3A, a part table and a lineitem table are defined in a database according to the first embodiment of this invention.

The part table includes three columns (Name, Brand, and PID). The part table is created by executing an SQL statement 301. The lineitem table includes three columns (PID, LineID, and OID). The lineitem table is created by executing an SQL statement 302.

An index "part_index" is also defined in the part table with a Name column and a PID column as keys. The index "part_index" is created by executing an SQL statement 303. Similarly, an index "lineitem_index" is defined in the lineitem table with a PID column and a LineID column as keys. The index "lineitem_index" is created by executing an SQL statement 304.

FIG. 3B is a diagram illustrating an example of an SQL statement for data search according to the first embodiment of this invention.

An SQL statement 305 is an SQL statement in which the part table and the lineitem table are joined through the PID columns to search for data that has "abc" as the value of the Brand column of the part table, and to sort search results based on the Name column of the part table and the LineID column of the lineitem table.

Figure 4:
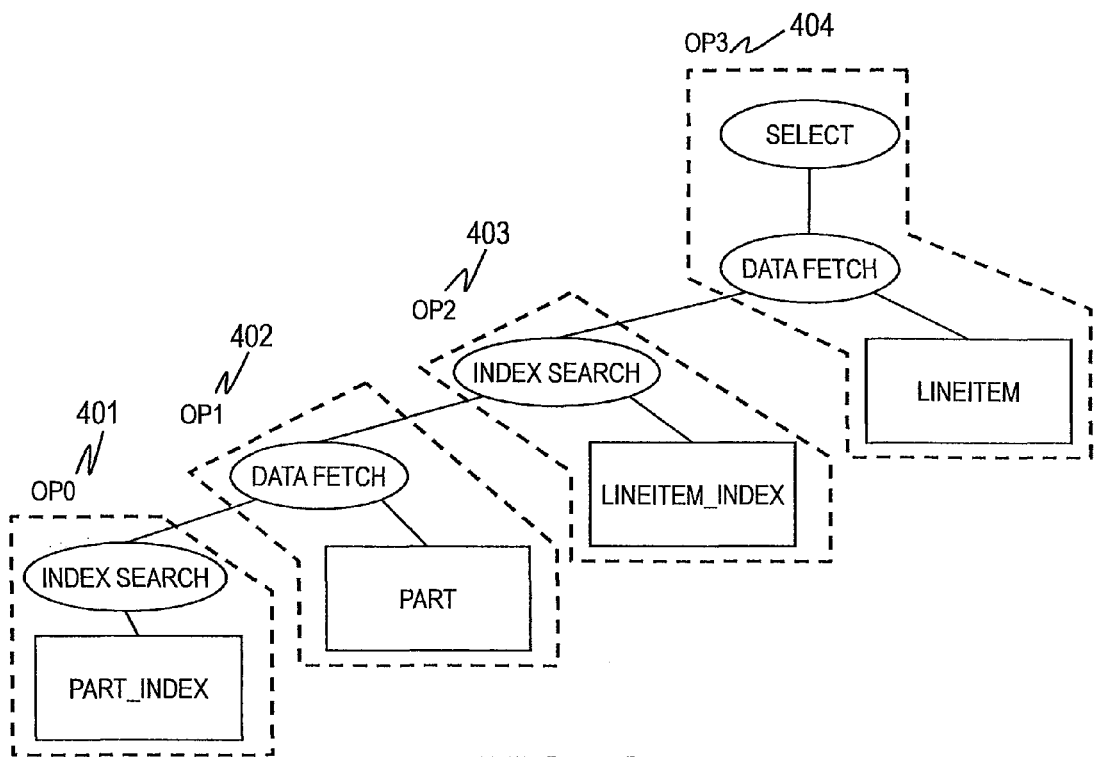
FIG. 4 is a diagram illustrating an example of a query plan that is created from a SQL statement according to the first embodiment of this invention.

FIG. 4 is a diagram illustrating an example of a query plan that is created from the SQL statement 305 according to the first embodiment of this invention.

The query plan of FIG. 4 is for joining the part table and the lineitem table by a nest loop join.

In OP0 (401), a pointer to a record in the part table that has "abc" as the value of the Brand column is obtained based on the index "part_index".

In OP1 (402), the pointer to the record in the part table that has been obtained in OP0 (401) is followed to obtain the record in the part table.

In OP2 (403), a pointer to a record in the lineitem table is obtained whose PID column value matches the PID column value of the record in the part table that has been obtained in OP1 (402).

In OP3 (404), the pointer to the record in the lineitem table that has been obtained in OP2 (403) is followed to obtain the record in the lineitem table.

The SQL statement 305 specifies that results output should be sorted in order, the Name column of the part table first and then the LineID column of the lineitem table. In the query plan of FIG. 4, however, the index "part_index" is accessed first and the index "lineitem_index" is accessed next. Accordingly, the Name column of the part table, the PID column of the part table, the PID column of the lineitem table, and the LineID column of the lineitem table are accessed in the order stated, and query results are arranged in this order. It is therefore determined that, in the query plan of FIG. 4, sort processing is unnecessary, in other words, sort cancel is possible.

A query plan created in this manner by the query receiving module 141 is handed to the query executing module 142, and executed by the OP executing module 153.

Figure 5:
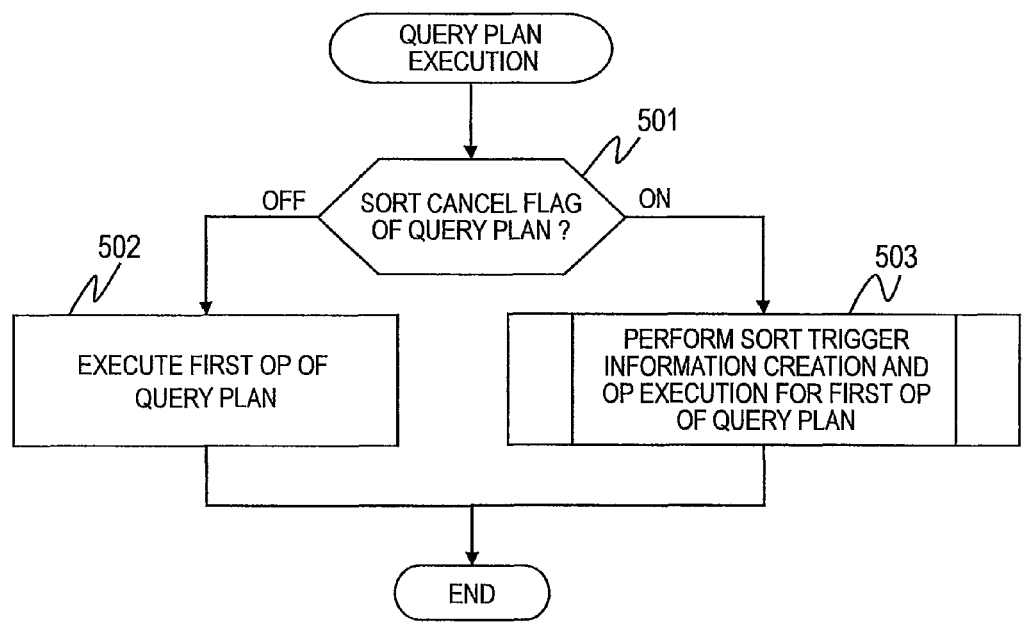
FIG. 5 is a flow chart illustrating steps of executing a created query plan according to the first embodiment of this invention.

FIG. 5 is a flow chart illustrating steps of executing a created query plan according to the first embodiment of this invention.

This processing is executed by the OP executing module 153 of the query executing module 142 after a query plan created by the query receiving module 141 is received.

The processor 112 first determines whether or not a sort cancel flag is set to the query plan created by the query receiving module 141 (Step 501).

In the case where a sort cancel flag is not set to the query plan (the outcome of Step 501 is "OFF"), the processor 112 executes the first OP in the query plan ("OP0" in the query plan of the example of FIG. 4) (Step 502).

On the other hand, in the case where a sort cancel flag is set to the query plan (the outcome of Step 501 is "ON"), the processor 112 executes the first OP in the query plan through sort trigger information creation and OP execution processing in which an OP is executed while sort trigger information is created (Step 503). Details of the sort trigger information creation and OP execution processing are described later with reference to FIG. 6.

In the OP executed in Step 502 and Step 503, data input requests are issued in a multiplex manner to the secondary storage (storage system 103). The first embodiment of this invention takes as an example a database processing system disclosed in JP 2007-34414 A.

Figure 6:
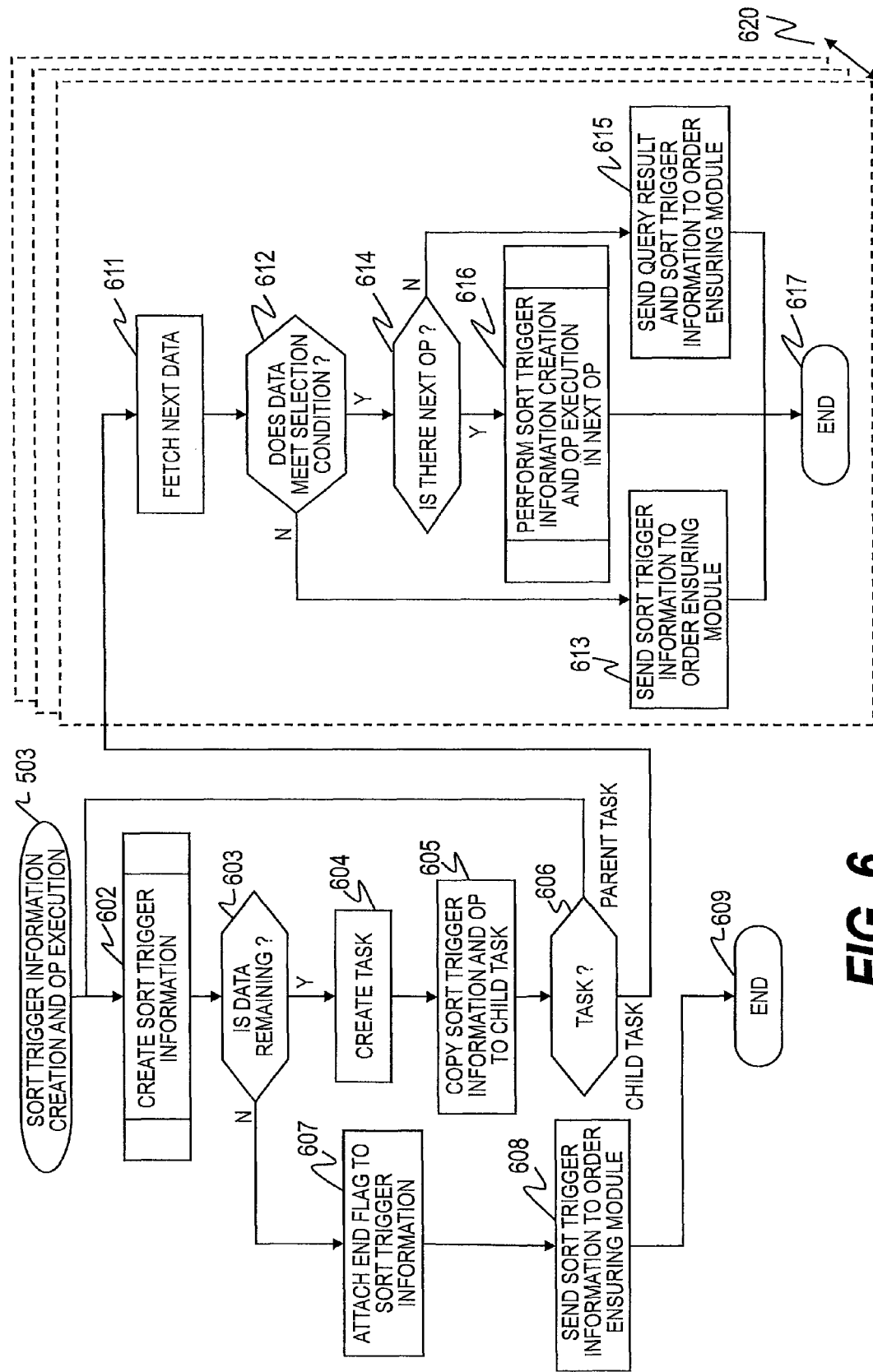
FIG. 6 is a flow chart illustrating steps of sort trigger information creation and OP execution processing according to the first embodiment of this invention.

FIG. 6 is a flow chart illustrating steps of the sort trigger information creation and OP execution processing according to the first embodiment of this invention.

The sort trigger information creation and OP execution processing is executed by the OP executing module 153 of the query executing module 142, and corresponds to Step 503 of the flow chart of FIG. 5.

The sort trigger information creation and OP execution processing is executed recursively and, upon execution, sort trigger information associated with the OP is set to a task. When the sort trigger information creation and OP execution processing is executed, initial values "OP0" and "0" are set to the OP and sort trigger information, respectively.

At the start of the sort trigger information creation and OP execution processing, the processor 112 first executes sort trigger information creation processing (Step 602). Executing the sort trigger information creation processing creates new sort trigger information. Details of the sort trigger information creation processing are described later with reference to FIG. 8.

The processor 112 next determines whether or not data to be processed in the OP is left (Step 603). Data yet to be processed corresponds to remaining index entries in the case where the OP is index scan, and corresponds to unread records in the case where the OP is table scan.

In the case where there is data yet to be processed (the outcome of Step 603 is "Y"), the processor 112 creates a new task (Step 604). The task from which the new task is created in Step 604 is treated as a parent task, and the task newly created in Step 604 from the parent task is treated as a child task.

Next, the processor 112 copies the OP and the sort trigger information that are held in the parent task to the created child task (Step 605). When the OP is assigned to the child task, the child task starts independent processing in order to process this OP, whereas creation of sort trigger information is started anew on the parent task side (Step 606). Steps 602 to 606 are repeated in the manner described above until every piece of data to be processed in the OP is processed. The repetition creates child tasks dynamically, thereby enabling the OP to be executed through a plurality of tasks (Step 620).

In the case where there is no more data to be processed (the outcome of Step 603 is "N"), the processor 112 sets an end flag to the sort trigger information (Step 607). The sort trigger information with the end flag attached thereto is sent to the order ensuring module 151 (Step 608).

Meanwhile, when the child task side starts processing independently of the parent task, the processor 112 fetches data allocated in the OP (Step 611). At this point, a data input request is sent to the storage system 103 as needed.

The processor 112 then determines whether or not the fetched data meets a selection condition (Step 612). In the case where the fetched data does not meet a selection condition (the outcome of Step 612 is "N"), a query result of a task that has executed this processing is not necessary. Although the query result is unnecessary, the processor 112 in this case sends sort trigger information to the order ensuring module 151 for the purpose of outputting partial sort results (Step 613).

In the case where the fetched data meets a selection condition (the outcome of Step 612 is "Y"), the processor 112 determines whether or not there is an OP to be processed next to the OP that is assigned to the task being processed (Step 614).

In the case where there is no OP to be processed next (the outcome of Step 614 is "N"), it means that the OP assigned to the task that is being executed is the last OP and that query result generation is therefore finished. In this case, the sort trigger information is sent along with query results to the order ensuring module 151 (Step 615).

In the case where there is the next OP (the outcome of Step 614 is "Y"), the processor 112 sets the next OP to be processed through the sort trigger information creation and OP execution processing (Step 616). This processing is thus executed recursively so that OPs are processed in an order that follows a created query plan.

Figure 7:
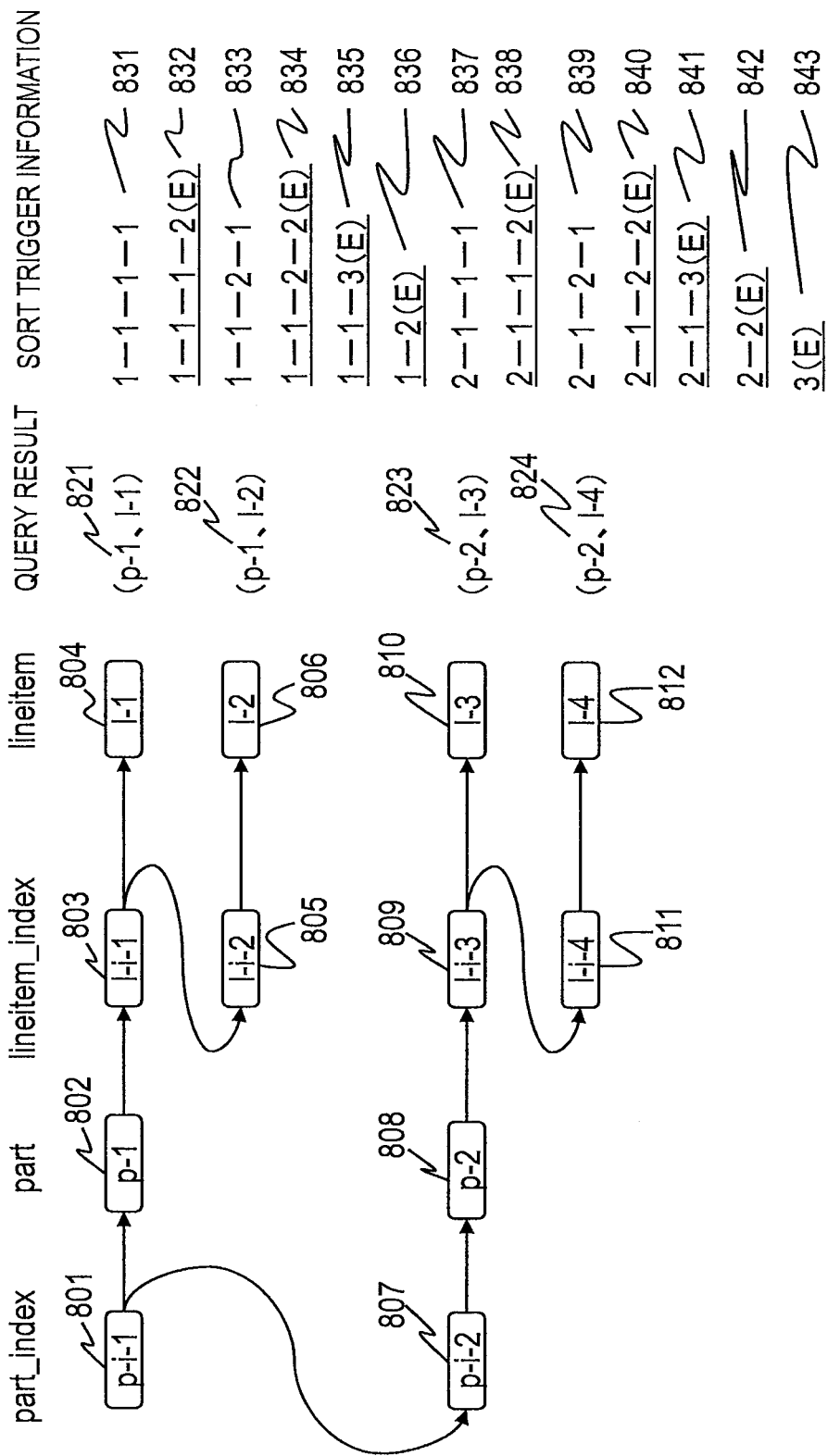
FIG. 7 is a diagram illustrating a process of how sort trigger information is created through the sort trigger information creation processing according to the first embodiment of this invention.

FIG. 7 is a diagram illustrating a process of how sort trigger information is created through the sort trigger information creation processing according to the first embodiment of this invention.

FIG. 7 illustrates sort trigger information that is created through the sort trigger information creation processing as a result of processing the query plan of FIG. 4.

Data 801 to data 812 represent pieces of data (index entries or records) accessed in respective OPs. Arrows connecting the data 801 to data 812 represent precedence relations in fetching data among a plurality of tasks which are created dynamically.

Sort trigger information is expressed by the hierarchical structure of OPs in a query plan and by the order of pieces of data accessed in respective OPs (data access number). The order of data accessed in an OP matches the storage locations of the data. Sort trigger information uses a data structure that allows for a comparison of processing order relations among OPs based on the hierarchical structure. In the example of FIG. 7, orders (numerical values) on the respective hierarchy levels of the query plan illustrated in FIG. 4 are linked by "-" to constitute sort trigger information 831 to sort trigger information 843.

Now, the process of creating sort trigger information that reflects the query plan of FIG. 4 is described. The query plan of FIG. 4 includes OPs that constitute four hierarchy levels. Sort trigger information for this query plan is therefore constituted of four numerical values linked by "-".

To give a specific description, "2-1-1-1" (837) is taken as an example. The four numerical values are, from left to right, a data access number in OP0, a data access number in OP1, a data access number in OP2, and a data access number in OP3.

Data "p-i-2" (807) of the index "part_index" is accessed second in OP0, and accordingly has a data access number "2". Data "p-2" (808) of the part table is accessed first on the part table in OP1 via the index "p-i-2", and accordingly has a data access number "1". Similarly, data "1-i-3" (809) of the index "lineitem_index" has a data access number "1" in OP2, and data "1-3" (810) of the lineitem table has a data access number "1" in OP3.

The end of OPs can be determined from sort trigger information to which an end flag is set. "1-1-3 (E)" (835) is an example of sort trigger information that has an end flag set thereto. The sort trigger information 835 has "1" as the data access number in OP0, "1" as the data access number in OP1, and "3" as the data access number in OP2, and an end flag set next to OP2.

"1-1-3 (E)" (835) represents sort trigger information in which, after "1-i-1" (803) and "1-i-2" (805) of the index "lineitem_index" are accessed in OP2 via "p-1" (802), next data is not found in the third-time access to the index "lineitem_index" and therefore an end flag is set.

For example, when "2-1-1-1" (837) is output, it is necessary to confirm that there are no query results generated from "p-i-1" (801). The fact that every OP processed based on the data 801 has been ended is confirmed by sending sort trigger information to which an end flag is set, specifically, sort trigger information "1-1-1-2 (E)" (832), "1-1-2-2 (E)" (834), "1-1-3 (E)" (835), and "1-2 (E)" (836), to the order ensuring module 151 (Step 608 of FIG. 6). Query results stop being generated in the middle of processing an OP, depending on some selection conditions. In this case, too, sort trigger information has to be sent to the order ensuring module 151 in order to confirm that no more query results are generated (Step 613 of FIG. 6).

Figure 8:
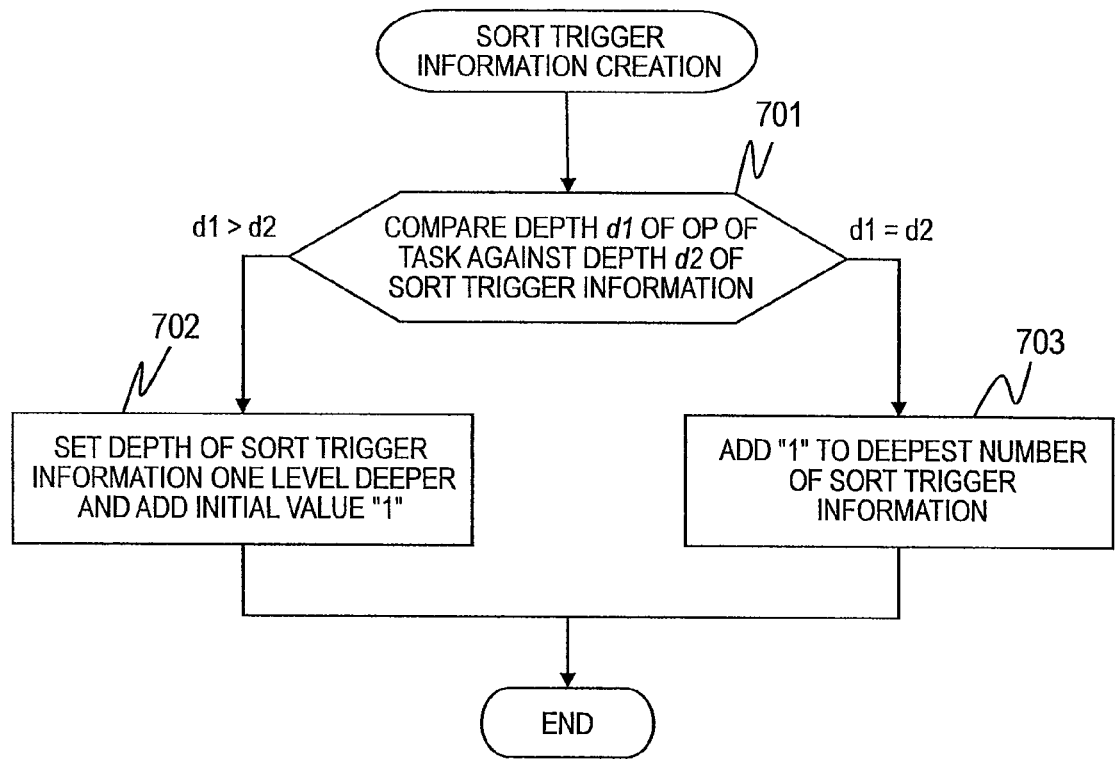
FIG. 8 is a flow chart illustrating steps of the sort trigger information creation processing according to the first embodiment of this invention.

FIG. 8 is a flow chart illustrating steps of the sort trigger information creation processing according to the first embodiment of this invention.

The sort trigger information creation processing is executed by the sort trigger information attaching module 154, which is included in the OP executing module 153 of the query executing module 142, and corresponds to Step 602 of the flow chart of FIG. 6. In the sort trigger information creation processing, sort trigger information and an OP that are set to the current task are referred to. Specific steps of the sort trigger information creation processing are described below.

The processor 112 first compares a depth d1, which is the depth of an OP set to the task, and a depth d2, which is the depth of sort trigger information (Step 701). As described above, a query plan is made up of hierarchized OPs, and depths in the hierarchy are defined as the depths of the respective OPs. In the query plan example of FIG. 4, OP0 has a depth 1, OP1 has a depth 2, OP2 has a depth 3, and OP3 has a depth 4. The depth of sort trigger information, on the other hand, is defined as the count of numerical values linked by "-" in the example of FIG. 7.

In the case where the sort trigger information depth d2 is smaller than the OP depth d1 (the outcome of Step 701 is "d1>d2"), it is the first time an OP associated with the task is executed. The processor 112 therefore sets the depth of the sort trigger information one level deeper. In other words, the processor 112 adds "-" and "1" to the current sort trigger information (Step 702).

In the case where the sort trigger information depth d2 is equal to the OP depth d1 (the outcome of Step 701 is "d1=d2"), the next data is to be referred to in the OP associated with the task. The processor 112 in this case adds "1" to the deepest number of the sort trigger information (Step 703).

Executing the sort trigger information creation processing of Step 602 of the flow chart of FIG. 6 creates sort trigger information illustrated in FIG. 7. Separate tasks executed in parallel send sort trigger information to the order ensuring module 151. The order ensuring module 151 consequently receives sort trigger information at random.

Figure 9:
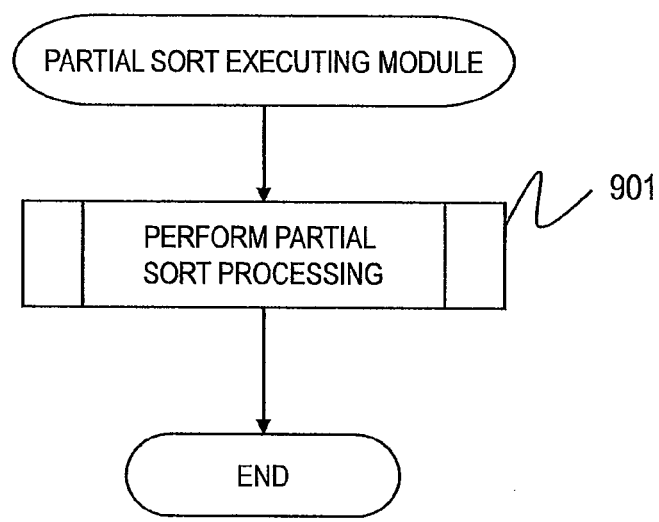
FIG. 9 is a flow chart illustrating steps of processing that is executed when the order ensuring module receives sort trigger information according to the first embodiment of this invention.

FIG. 9 is a flow chart illustrating steps of processing that is executed when the order ensuring module 151 receives sort trigger information according to the first embodiment of this invention.

Upon reception of sort trigger information in the order ensuring module 151, the processor 112 uses the partial sort executing module 152 to execute partial sort processing (Step 901). Details of the partial sort processing are described later with reference to FIG. 10.

Figure 10:
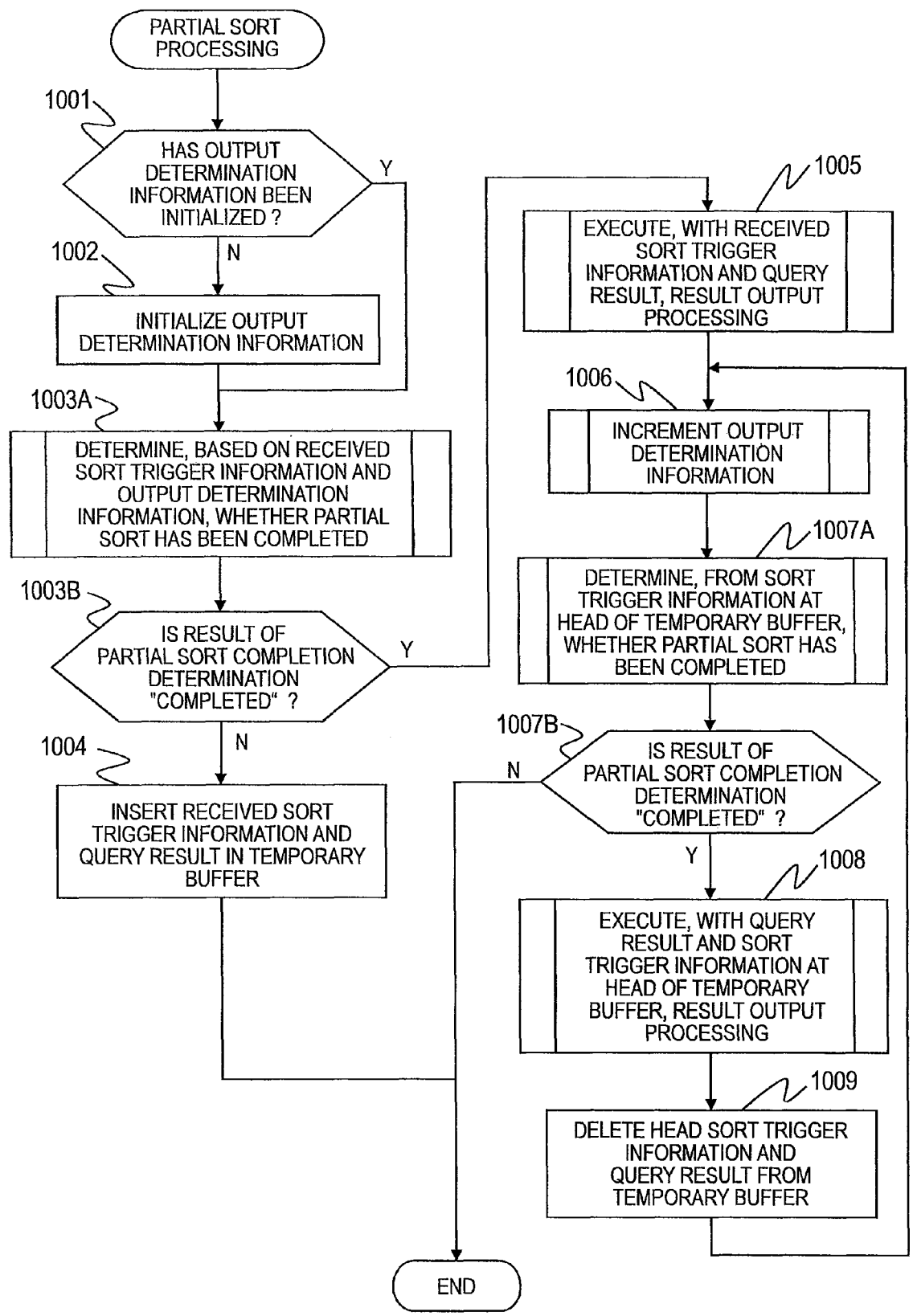
FIG. 10 is a flow chart illustrating steps of partial sort processing according to the first embodiment of this invention.

FIG. 10 is a flow chart illustrating steps of the partial sort processing according to the first embodiment of this invention.

The partial sort executing module 152 includes output determination information, which holds values of sort trigger information to be output next. The output determination information has the same data structure as sort trigger information. Specifically, the output determination information indicates that a task executed before a task that is associated with sort trigger information matching the output determination information has been completed and that a query result has been output. Steps of the partial sort processing are described below.

The processor 112 first determines whether or not the output determination information has been initialized (Step 1001). In the case where the output determination information has not been initialized (the outcome of Step 1001 is "N"), the output determination information is initialized (Step 1002). Set as an initial value of the output determination information is sort trigger information for which a query result is output first. In the example of sort trigger information according to the first embodiment of this invention, the sort trigger information is constituted of as many "1" as the count of hierarchy levels in the query plan that are linked by "-" as described above.

The processor 112 executes partial sort completion determining processing based on the sort trigger information received in the order ensuring module 151 and the output determination information (Step 1003A). In the partial sort completion determining processing, the received sort trigger information is compared against the output determination information to determine whether or not partial sorting has been completed for this sort trigger information. Details of the partial sort completion determining processing are described later with reference to FIG. 11.

The processor 112 determines whether or not the result of the partial sort completion determining processing is "completed" (Step 1003B). In the case where the result of the partial sort completion determining processing is not "completed", in other words, in the case where the result is determined as "not completed" (the outcome of Step 1003B is "N"), the received sort trigger information and query result are stored in the temporary buffer 144 (Step 1004), and the partial sort processing is ended. The temporary buffer 144 temporarily holds a pair of sort trigger information and a query result until the pair is output from the order ensuring module 151. Sort trigger information and a query result that are paired with each other are stored after sorting based on the sort trigger information.

On the other hand, in the case where the result of the partial sort completion determining processing is determined as "completed" (the outcome of Step 1003B is "Y"), the processor 112 executes result output processing based on the sort trigger information and the query result (Step 1005). In the result output processing, the partial sort executing module 152 outputs the query result. Details of the result output processing are described later with reference to FIG. 12.

Subsequently, the processor 112 increments the output determination information in order to determine anew which sort trigger information has completed partial sorting (Step 1006). Details of the output determination information incrementing processing are described later with reference to FIG. 13.

The processor 112 determines whether or not a query result stored in the temporary buffer 144 can be output by comparing the incremented output determination information against sort trigger information stored in the temporary buffer 144. The temporary buffer 144 stores sort trigger information in a sorted state and, based on sort trigger information that is stored at the head of the temporary buffer 144 and the output determination information, the partial sort completion determining processing is executed (Step 1007A). Whether or not the result of the partial sort completion determining processing is "completed" is then determined (Step 1007B).

In the case where the result of the partial sort completion determining processing is determined as "completed" for sort trigger information that is stored at the head of the temporary buffer 144 (the outcome of Step 1007B is "Y"), the processor 112 executes the result output processing to output the associated query result (Step 1008).

The processor 112 deletes the sort trigger information that is stored at the head of the temporary buffer 144 and its associated query result from the temporary buffer 144 (Step 1009), and increments the output determination information once more (Step 1006).

The processor 112 repeats Steps 1006 to 1009 and, while the result of the partial sort completion determining processing is kept determined as "completed" for sort trigger information that is stored at the head of the temporary buffer 144, outputs associated query results in order. In the case where the result of the partial sort completion determining processing is kept determined as "not completed" for sort trigger information that is stored at the head of the temporary buffer 144 (the outcome of Step 1007B is "N"), the partial sort processing is ended.

Figure 11:
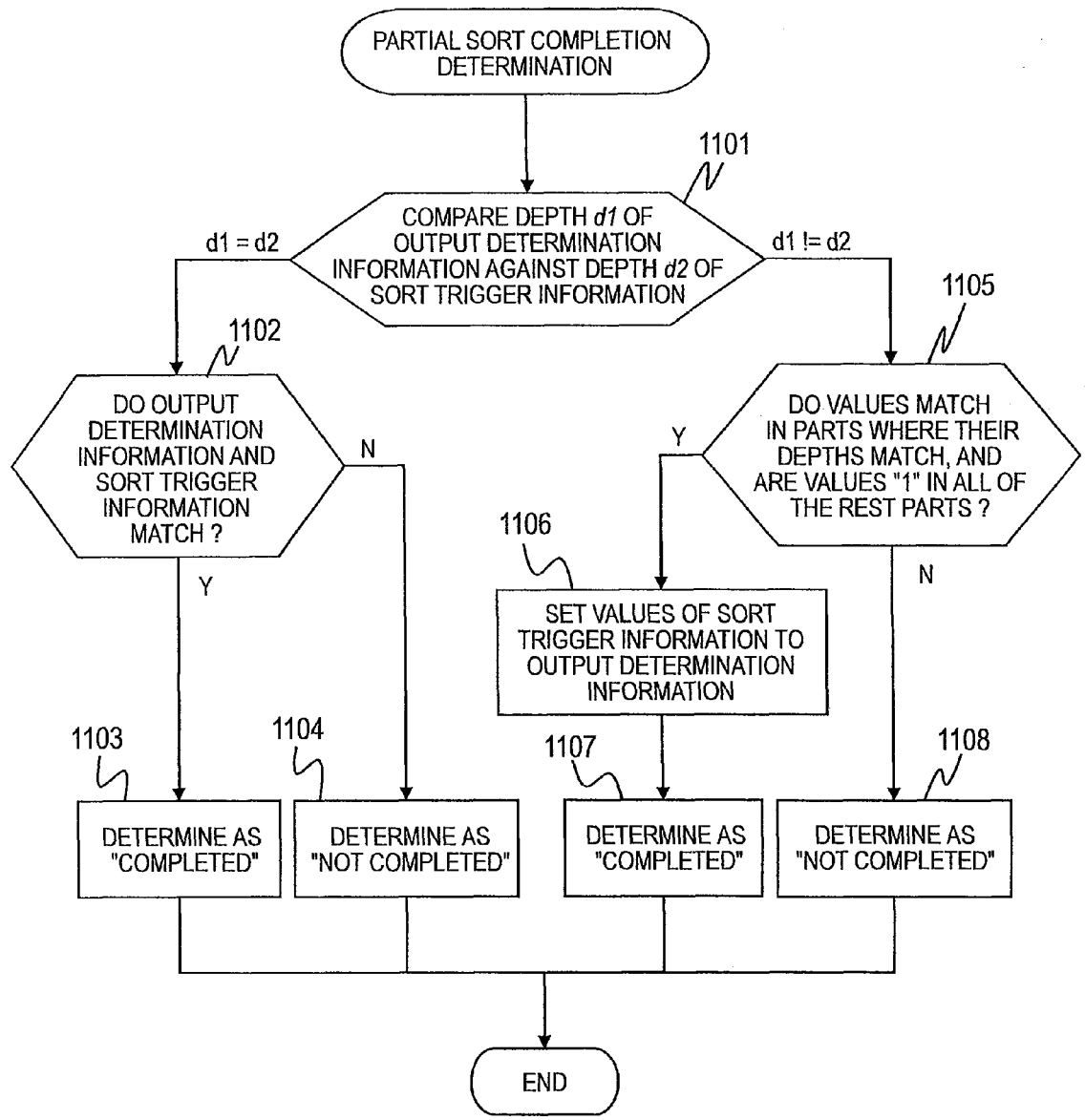
FIG. 11 is a flow chart illustrating steps of partial sort completion determining processing according to the first embodiment of this invention.

FIG. 11 is a flow chart illustrating steps of the partial sort completion determining processing according to the first embodiment of this invention.

The processor 112 first compares the depth d2 of the sort trigger information for which the determining processing is performed against the depth d1 of the output determination information (Step 1101). In the case where the depth d2 of the sort trigger information for which the determining processing is performed is equal to the depth d1 of the output determination information (the outcome of Step 1101 is "d1=d2"), the processor 112 determines whether or not their values on the respective hierarchy levels match, in other words, whether or not the sort trigger information and the output determination information match (Step 1102). In the case where the sort trigger information and the output determination information match (the outcome of Step 1102 is "Y"), the result of the partial sort completion determining processing is determined as "completed" (Step 1103). In the case where the sort trigger information and the output determination information do not match (the outcome of Step 1102 is "N"), the result of the partial sort completion determining processing is determined as "not completed" (Step 1104).

On the other hand, in the case where the depth d2 of the sort trigger information for which the determining processing is performed differs from the depth d1 of the output determination information (the outcome of Step 1101 is "d1!=d2"), the processor 112 determines whether or not the sort trigger information and the output determination information have the same numerical values on the hierarchy levels where their depths match, and have a value "1" on all of the remaining hierarchy levels (Step 1105). In the case where the condition of Step 1105 is met (the outcome of Step 1105 is "Y"), the sort trigger information is set to the output determination information (Step 1106). Further, the sort trigger information for which the determining processing is performed is determined as "completed" (Step 1107). In the case where the condition of Step 1105 is not met (the outcome of Step 1105 is "N"), the sort trigger information for which the determining processing is performed is determined as "not completed" (Step 1108).

Figure 12:
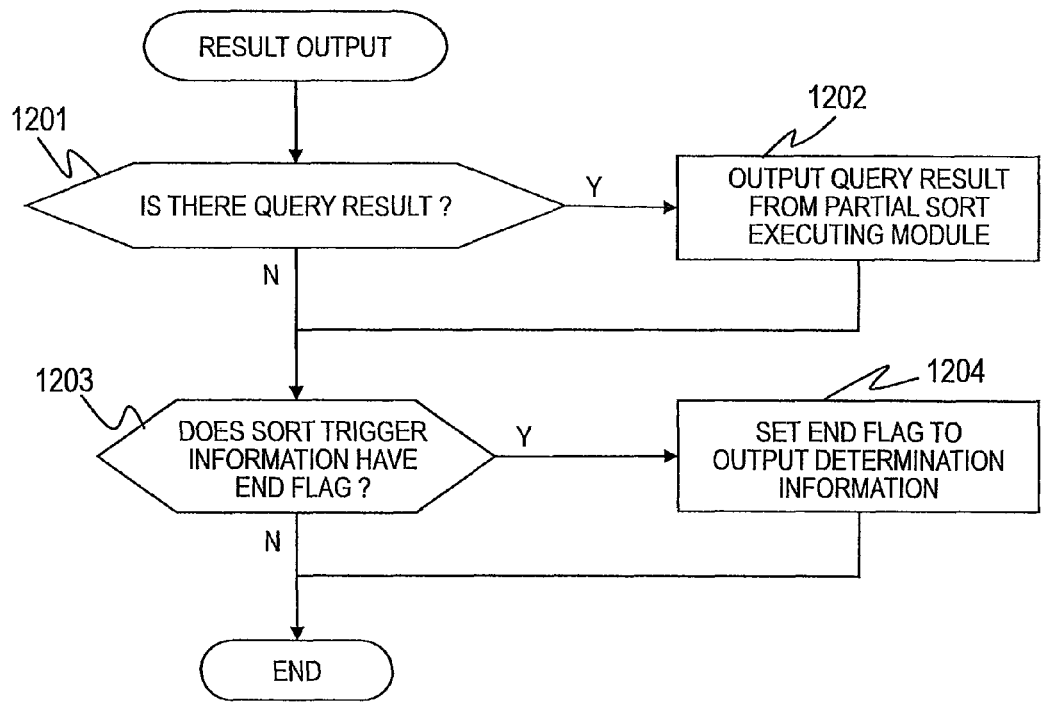
FIG. 12 is a flow chart illustrating steps of result output processing according to the first embodiment of this invention.

FIG. 12 is a flow chart illustrating steps of the result output processing according to the first embodiment of this invention.

The processor 112 first determines whether or not there is a query result associated with sort trigger information that is being processed (Step 1201). In the case where there is an associated query result (the outcome of Step 1201 is "Y"), the partial sort executing module 152 outputs this query result (Step 1202).

In the case where there is no associated query result (the outcome of Step 1201 is "N"), or in the case where Step 1202 is ended, the processor 112 determines whether or not the sort trigger information has an end flag set thereto (Step 1203). In the case where the sort trigger information has an end flag set thereto (the outcome of Step 1203 is "Y"), an end flag is set to the output determination information (Step 1204).

In the case where the sort trigger information does not have an end flag set thereto (the outcome of Step 1203 is "N"), or in the case where Step 1204 is ended, the processor 112 finishes the result output processing.

Figure 13:
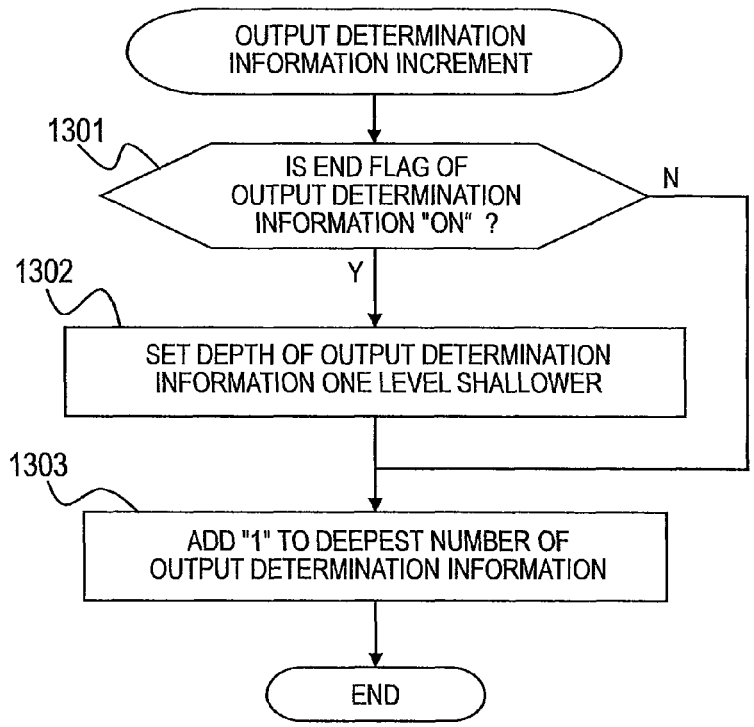
FIG. 13 is a flow chart illustrating steps of output determination information incrementing processing according to the first embodiment of this invention.

FIG. 13 is a flow chart illustrating steps of the output determination information incrementing processing according to the first embodiment of this invention.

The processor 112 first determines whether or not the output determination information has an end flag set thereto (Step 1301). In the case where the output determination information has an end flag set thereto (the outcome of Step 1301 is "Y"), the depth of the output determination information is set one level shallower (Step 1302).

In the case where the output determination information does not have an end flag set thereto (the outcome of Step 1301 is "N"), or in the case where Step 1302 is completed, the processor 112 adds "1" to the deepest number of the output determination information (Step 1303).

Figure 14:
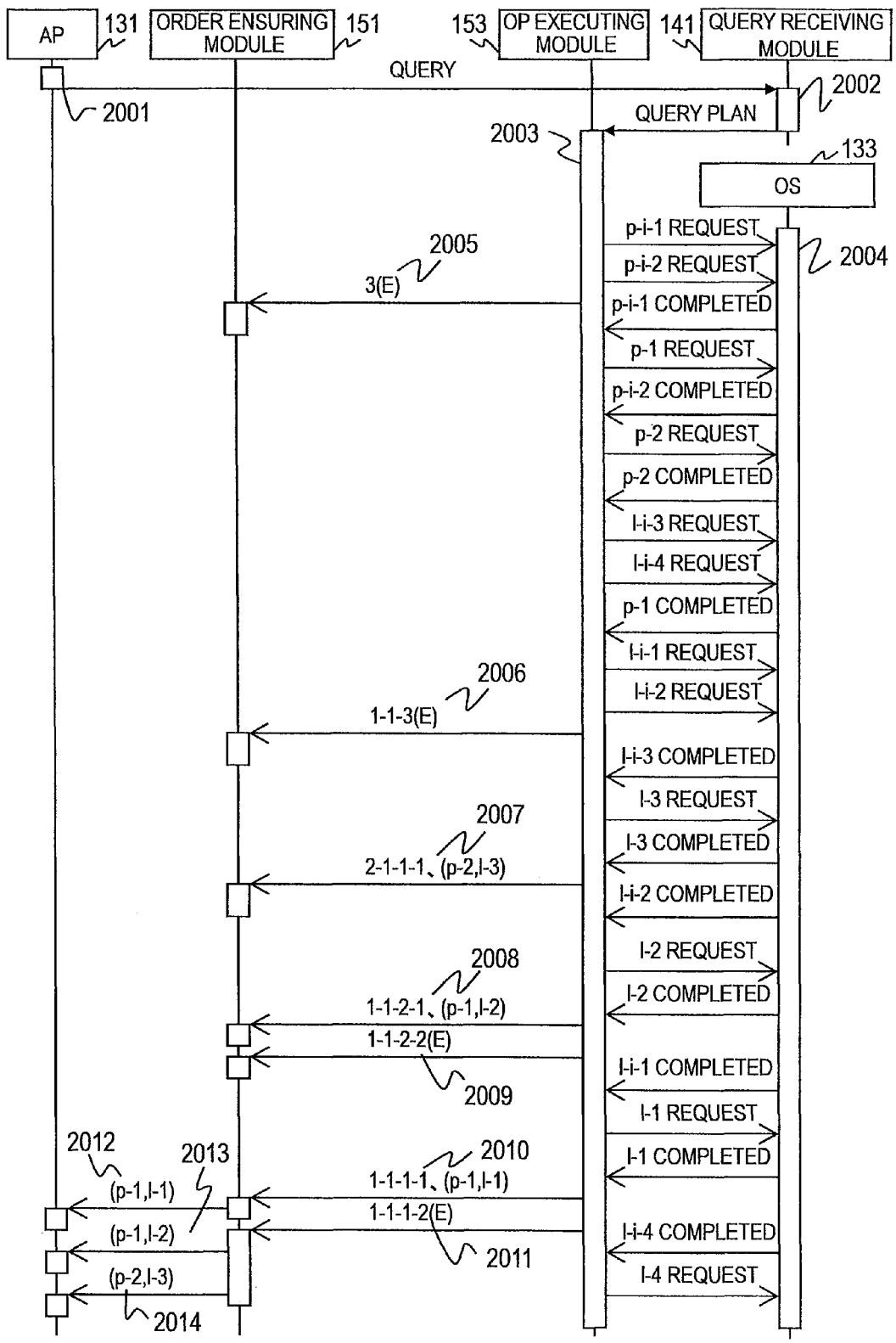
FIG. 14 is a diagram illustrating an operation example of a database management system in the first embodiment of this invention, and is a timing chart illustrating how the AP, the query receiving module, the OP executing module, the OS, and the order ensuring module interact with one another.

FIG. 14 is a diagram illustrating an operation example of the database management system 132 in the first embodiment of this invention, and is a timing chart illustrating how the AP 131, the query receiving module 141, the OP executing module 153, the OS 133, and the order ensuring module 151 interact with one another. The AP 131, the query receiving module 141, the OP executing module 153, the OS 133, and the order ensuring module 151 are programs executed by the processor 112 as described above.

First, the AP 131 issues a query request to the database management system 132 (2001).

The database management system 132 uses the query receiving module 141 to receive the query request issued by the AP 131 and to create a query plan (2002). Thereafter, the OP executing module 153 executes the query plan created by the query receiving module 141 (2003). In executing the query plan, the OP executing module 153 creates a task as the need arises, and sends a data input request to the OS 133 (2004).

Communication sessions between the processing of the OP executing module 153 (2003) and the processing of the OS 133 (2004) are for the issuing and fulfillment of a data input request. The operation example illustrated in FIG. 14 is that of the query plan of FIG. 4. The order of communication sessions between the OP executing module 153 and the OS 133 is varied depending on the presence or absence of a database buffer, the order in which data input requests are fulfilled, or the like.

In the processing of the OP executing module 153 (2003), a plurality of tasks are processed in the order in which data input requests are fulfilled and, as soon as a pair of sort trigger information and a query result or sort trigger information can be sent, the pair or the sort trigger information is sent to the order ensuring module 151 (2005 to 2011). The order of sending sort trigger information-query result pairs and pieces of sort trigger information to the order ensuring module 151 that is illustrated in FIG. 14 is merely an example and, because tasks are independently executed in the OP executing module 153, the sending order is varied depending on the CPU scheduling of the tasks or other factors.

Receiving sort trigger information-query result pairs and sort trigger information, the order ensuring module 151 uses the partial sort executing module 152 to perform partial sorting on the query results. For the sorting executed at this point, a detailed operation is described later with reference to FIG. 15. In the operation example of FIG. 14, by the time a data input request "1-4" is sent, the partial sort executing module 152 has output three query results (2012 to 2014) to the AP 131.

Figure 15:
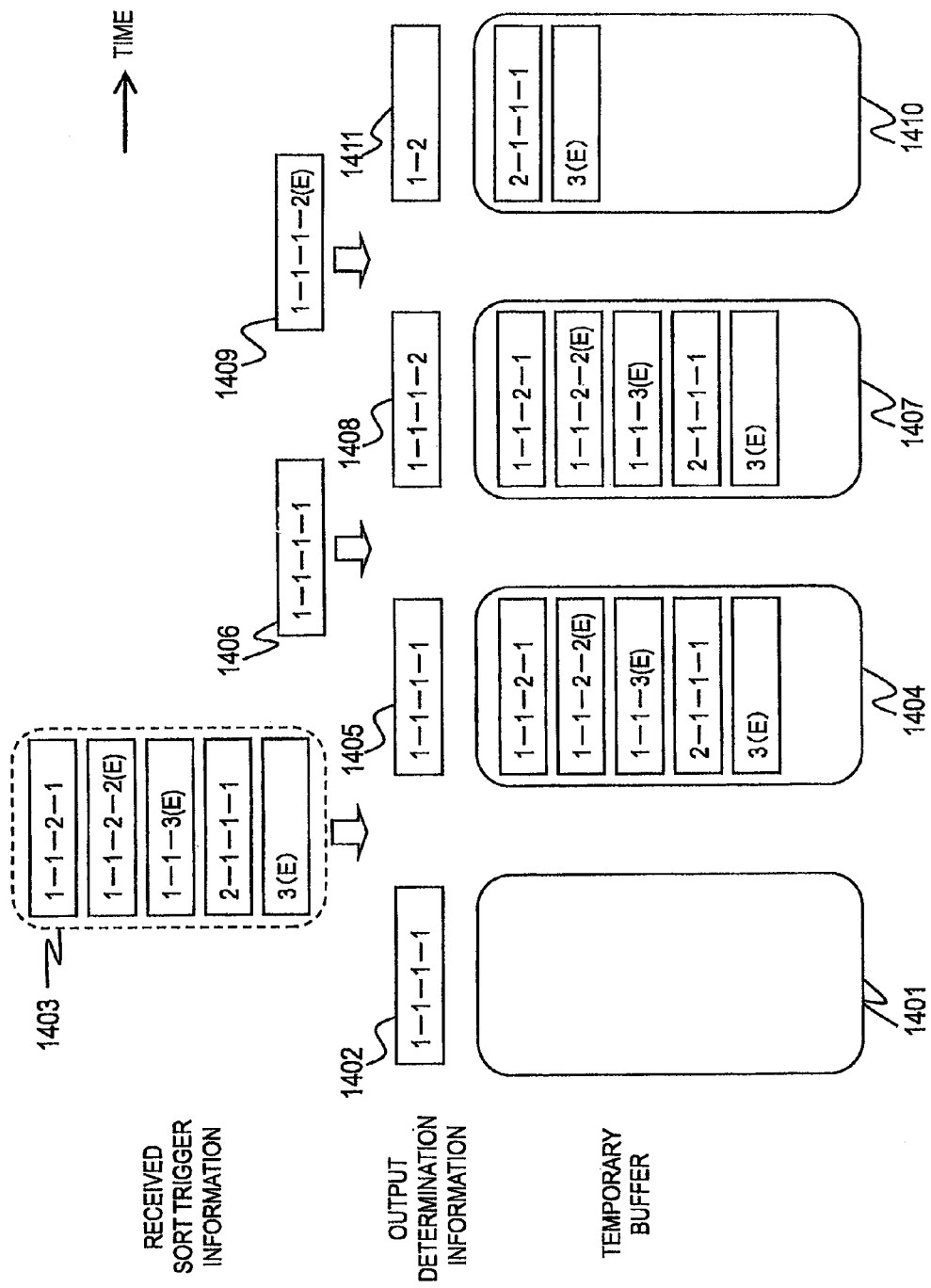
FIG. 15 is a diagram illustrating an example of processing that is executed by a partial sort executing module according to the first embodiment of this invention.

FIG. 15 is a diagram illustrating an example of processing that is executed by the partial sort executing module 152 according to the first embodiment of this invention. In FIG. 15, query results are omitted from the illustration but the temporary buffer 144 stores sort trigger information and a query result in a pair.

In the initial state, the temporary buffer 144 is empty (1401), and an initial value "1-1-1-1" is set to the output determination information (1402).

When the OP executing module 153 starts processing, the order ensuring module 151 receives a plurality of pieces of sort trigger information 1403 from the OP executing module 153. The sort trigger information 1403 does not match the output determination information, and therefore is stored in the temporary buffer 144 in the order of the sort trigger information (1404).

Then, the order ensuring module 151 receives sort trigger information "1-1-1-1" (1406), at which point the result output processing of FIG. 12 is executed and the steps of FIG. 13 are followed to increment the output determination information (1408). Once the output determination information is incremented, the partial sort completion determining processing of FIG. 11 is executed for the sort trigger information stored in the temporary buffer 144. However, the temporary buffer 144 in the state 1404 does not include sort trigger information that is determined as completed, and hence the state of the temporary buffer 144 remains the same (1407).

Subsequently, the order ensuring module 151 receives sort trigger information "1-1-1-2 (E)" (1409). The received sort trigger information matches the output determination information, and the result output processing is therefore executed. Further, the output determination information is incremented and the partial sort completion determining processing is executed. As a result, the pieces of sort trigger information stored in the temporary buffer 144 ("1-1-2-1", "1-1-2-2 (E)", and "1-1-3 (E)") are determined as completed and sequentially output, starting from the head of the temporary buffer 144 (1410). The output determination information is updated to "1-2" at this point (1411).

As described above, the partial sort executing module 152 determines from sort trigger information whether or not partial sorting has been completed, and outputs a query result associated with sort trigger information that is determined as completed.

In the first embodiment of this invention, when a query result is generated in the OP executing module 153, sort trigger information is created which allows for an order comparison based on the hierarchical structure of OPs in a query plan and data access numbers in the respective OPs. The order ensuring module 151 receives sort trigger information and its associated query result, and executes partial sorting based on the sort trigger information. The first embodiment of this invention thus enables a database processing system that issues data input requests in a multiplex manner to secondary storage to output query results without performing sort processing on all query results.

Further, according to the first embodiment of this invention, partial sort processing in which partial query results are sorted is executed based on sort trigger information that is attached to a query result. By executing the partial sort processing, query results that have finished sorting can be output before all query results are obtained.

The data input request issuing order in the case of issuing data input requests in a multiplex manner as in the first embodiment of this invention is the same as in the case of issuing data input requests one at a time. Accordingly, in the overall query processing, query results are generated in an order that is close to the data input request issuing order. It is therefore expected that the partial sort processing requires a small space (temporary buffer 144) even when the database scale is large.

Second Embodiment

Next, a second embodiment of this invention is described. In the second embodiment of this invention, a threshold is set for the memory capacity that can be used by the temporary buffer 144 and, in the case where the used memory capacity exceeds the threshold, sort processing that utilizes a temporary disk space is executed. The temporary disk space can be specified externally, and may be a storage space provided by the storage system 103 or a storage space provided by the host 101.

The second embodiment of this invention is the same as the first embodiment except for partial sort processing by the partial sort executing module 152. The following description is about the difference of the second embodiment from the first embodiment.

Figure 16:
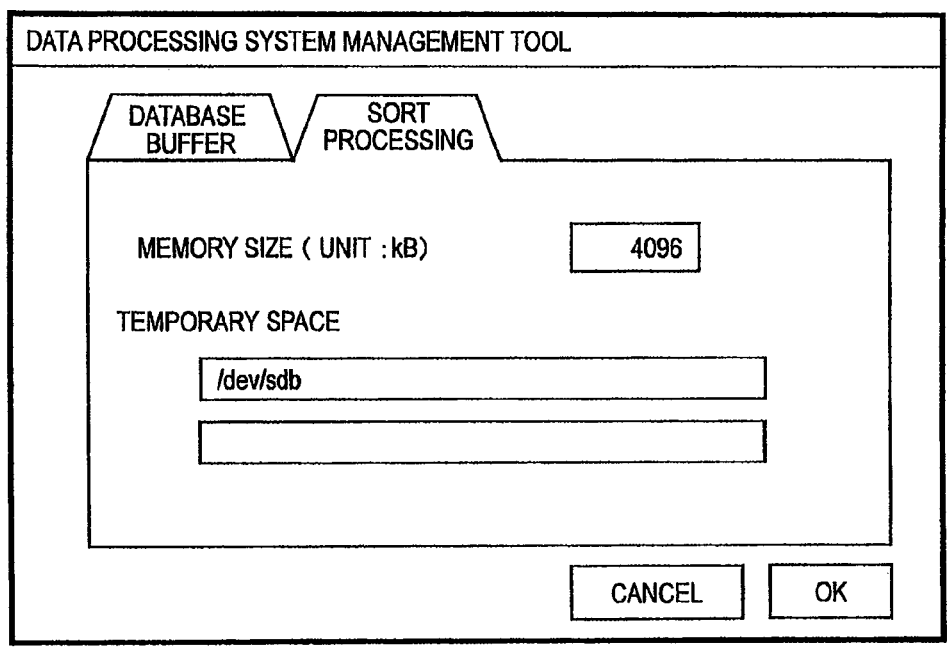
FIG. 16 is a diagram illustrating an example of a setting window of a database management system management tool according to a second embodiment of this invention.

FIG. 16 is a diagram illustrating an example of a setting window of a database management system management tool according to the second embodiment of this invention.

Set on the setting window of FIG. 16 are a threshold for the memory capacity that can be used by the temporary buffer 144 and a temporary disk space that is used in sort processing. The usable memory capacity threshold and the temporary disk space may be specified via a setting file.

Figure 17:
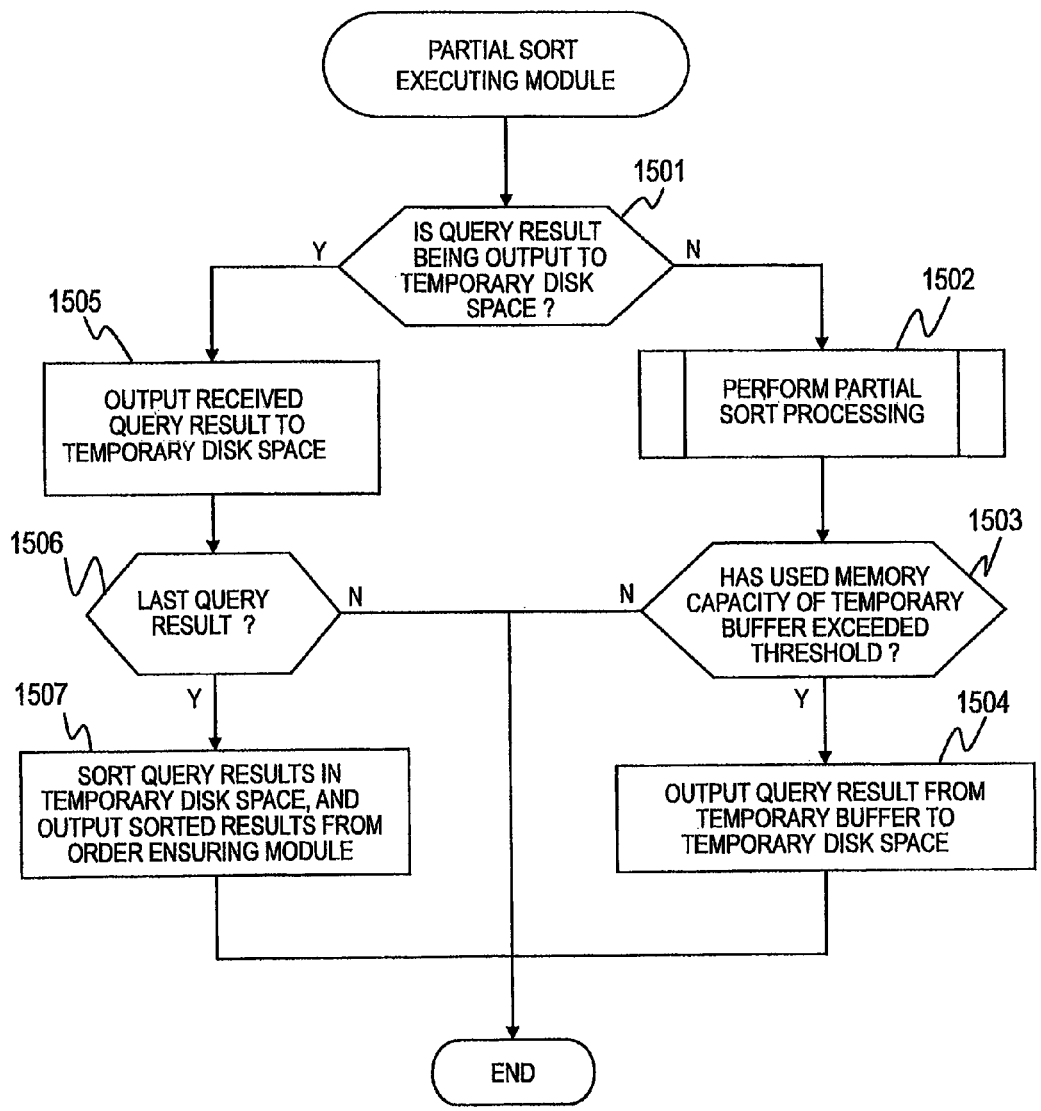
FIG. 17 is a flow chart illustrating steps that are taken by a partial sort executing module to execute partial sorting based on how much capacity is used by a temporary buffer according to the second embodiment of this invention.

FIG. 17 is a flow chart illustrating steps that are taken by the partial sort executing module 152 to execute partial sorting based on how much capacity is used by the temporary buffer 144 according to the second embodiment of this invention.

The processor 112 receives sort trigger information and determines whether or not a query result is being output to the temporary disk space (Step 1501). In the case where a query result is not being output to the temporary disk space (the outcome of Step 1501 is "N"), it means that the partial sort processing of FIG. 10 which uses the temporary buffer 144 is being executed. In this case, the execution of the partial sort processing using the temporary buffer 144 is continued (Step 1502).

Finishing processing the received sort trigger information, the processor 112 determines whether or not the used memory capacity of the temporary buffer 144 has exceeded a threshold (Step 1503). In the case where the used memory capacity of the temporary buffer 144 is equal to or smaller than the threshold (the outcome of Step 1503 is "N"), this processing is ended. In the case where the used memory capacity of the temporary buffer 144 exceeds the threshold (the outcome of Step 1503 is "Y"), every query result stored in the temporary buffer 144 is output to the temporary disk space (Step 1504).

In the case where a query result is being output to the temporary disk space (the outcome of Step 1501 is "Y"), it means that sort processing that uses the temporary disk space is being executed. Received query results are therefore output to the temporary disk space (Step 1505).

The processor 112 then determines whether or not every query result to be generated has been generated (Step 1506). In the case where there is a query result yet to be generated (the outcome of Step 1506 is "N"), this processing is ended. In the case where every query result has been generated (the outcome of Step 1506 is "Y"), query results stored in the temporary disk space are sorted to be output by the order ensuring module 151 (Step 1507). Whether every query result to be generated has been generated or not can be determined by checking the task management module 143 for the presence or absence of a task that is being processed. In the case where the threshold is exceeded, whether every query result has been generated or not can also be determined by managing only sort trigger information and output determination information.

As has been described, the second embodiment of this invention can switch to sort processing that uses a temporary disk space in the case where the used memory capacity of the temporary buffer 144 exceeds a threshold specified in advance.

According to the second embodiment of this invention, an upper limit is set to the memory capacity that is used in partial sort processing and, in the case where the upper limit is exceeded, a switch to external sorting which uses storage is made, to thereby prevent partial sort processing from consuming more memory capacity than necessary.

Third Embodiment

Next, a third embodiment of this invention is described. In the third embodiment of this invention, in the case where the used memory capacity exceeds a threshold, the capacity used by the temporary buffer 144 is reduced by processing a task that is necessary to output query results temporarily stored in the memory before other tasks.

The third embodiment of this invention is the same as the first embodiment, except for information managed by the task management module 143 and steps of partial sort processing executed by the partial sort executing module 152. The following description is about the differences of the third embodiment from the first embodiment.

Figures 18, 19:
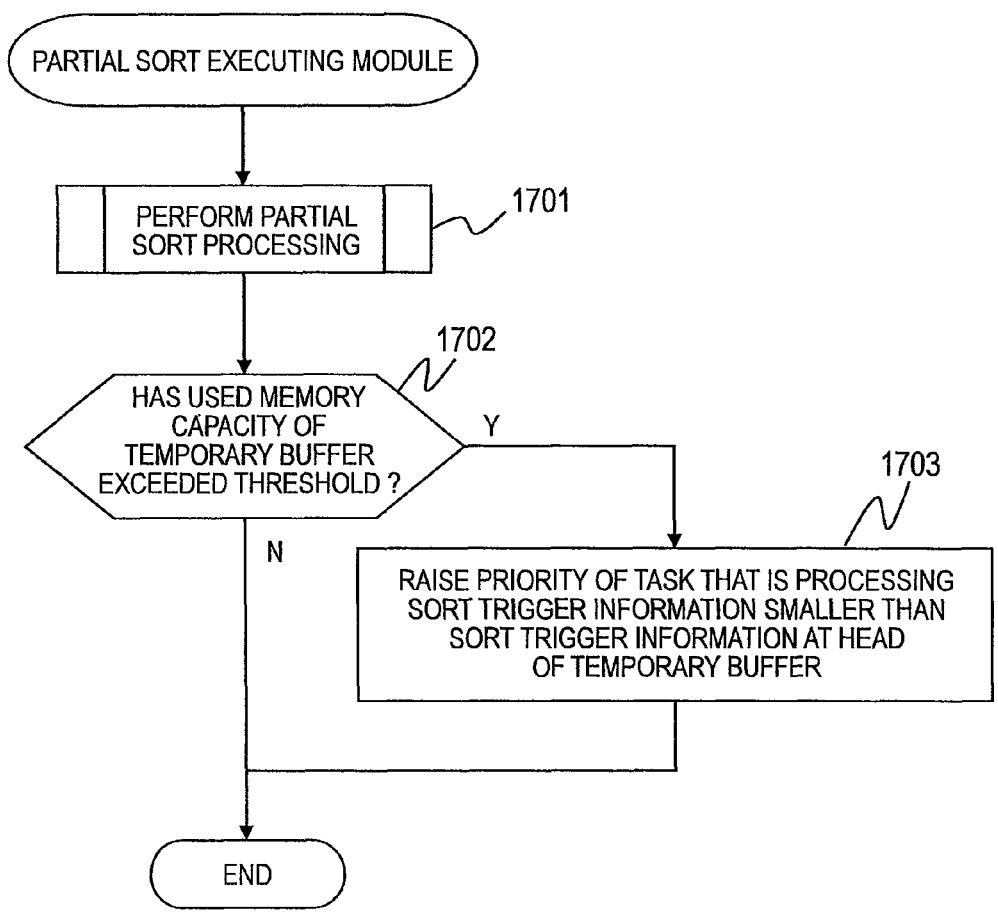
FIG. 18 is a diagram illustrating task management information that is managed by a task management module according to a third embodiment of this invention.
FIG. 19 is a flow chart illustrating steps of controlling priority of a task based on how much capacity is used by a temporary buffer after partial sorting is executed according to the third embodiment of this invention.

FIG. 18 illustrates task management information that is managed by the task management module 143 according to the third embodiment of this invention.

Task management information includes information necessary to manage a task, such as a task identifier 1601 by which a task being executed is identified. The task management information according to the third embodiment of this invention additionally includes sort trigger information 1602. The sort trigger information 1602 is sort trigger information associated with a task that is identified by the task identifier 1601.

FIG. 19 is a flow chart illustrating steps of controlling the priority of a task based on how much capacity is used by the temporary buffer after partial sorting is executed according to the third embodiment of this invention.

As in the first embodiment, the processor 112 executes partial sort processing upon reception of sort trigger information (Step 1701). After the partial sort processing is finished, the processor 112 determines whether or not the memory capacity used by the temporary buffer 144 exceeds a threshold (Step 1702). In the case where the memory capacity used by the temporary buffer 144 is equal to or smaller than the threshold (the outcome of Step 1702 is "N"), this processing is ended.

On the other hand, in the case where the memory capacity used by the temporary buffer 144 exceeds the threshold (the outcome of Step 1702 is "Y"), the processor 112 controls such that a task necessary to output query results stored in the temporary buffer 144 is processed before other tasks (Step 1703). Specifically, which task is associated with sort trigger information that is smaller than sort trigger information stored at the head of the temporary buffer 144 is identified from the task management information of the task management module 143, and the identified task is processed before other tasks (Step 1703). When the task is a process-level or kernel-level thread, the priority of the task is raised with the use of a nice function. In the case where the task is a user-level thread, this task is processed first among tasks managed by the database management system 132 and queued in an executable queue.

Figure 20:
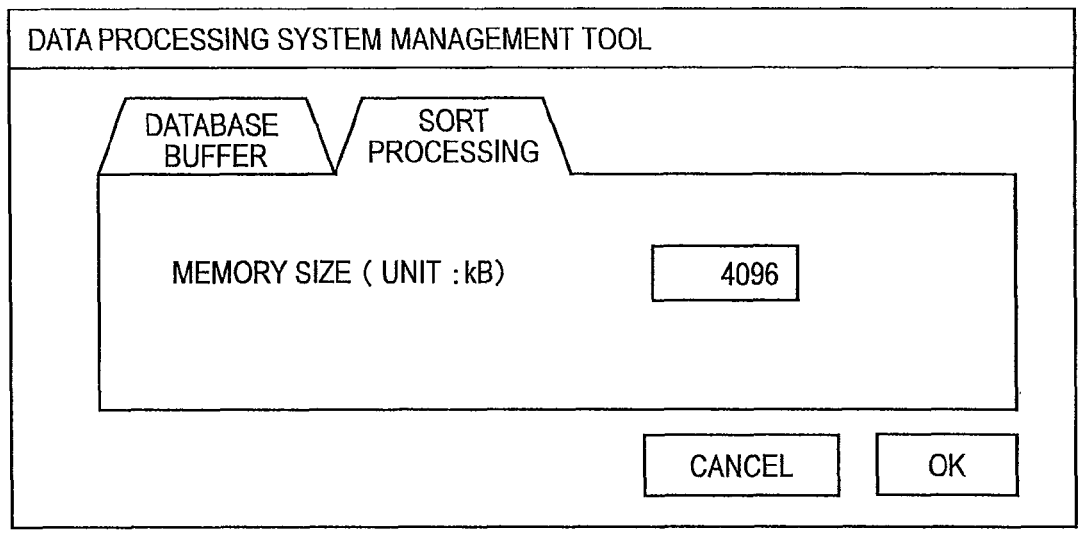
FIG. 20 is a diagram illustrating an example of a setting window of a database management system management tool according to the third embodiment of this invention.

FIG. 20 is a diagram illustrating an example of a setting window of a database management system management tool according to the third embodiment of this invention.

Set on the setting window of FIG. 20 is a threshold for the memory capacity that can be used by the temporary buffer 144. The usable memory capacity threshold may be specified via a setting file.

As has been described, according to the third embodiment of this invention, a task that is causing an increase in the used memory capacity of the temporary buffer 144 can be identified. Processing the identified task before other tasks reduces the capacity used by the temporary buffer 144 and memory consumption is thus kept small.

Fourth Embodiment

Next, a fourth embodiment of this invention is described. In the fourth embodiment of this invention, in the case where the used memory capacity exceeds a threshold, control is executed such that a task that is necessary to output query results temporarily stored in the memory is processed before other tasks, as in the third embodiment. The control according to the fourth embodiment is particularly for executing input/output processing relevant to the necessary task before other I/Os when the input/output processing of the necessary task is causing a bottleneck.

The fourth embodiment of this invention is the same as the first embodiment, except for information managed by the task management module 143 and steps of partial sort processing executed by the partial sort executing module 152. The following description is about the differences of the fourth embodiment from the first embodiment.

Figures 21, 22:
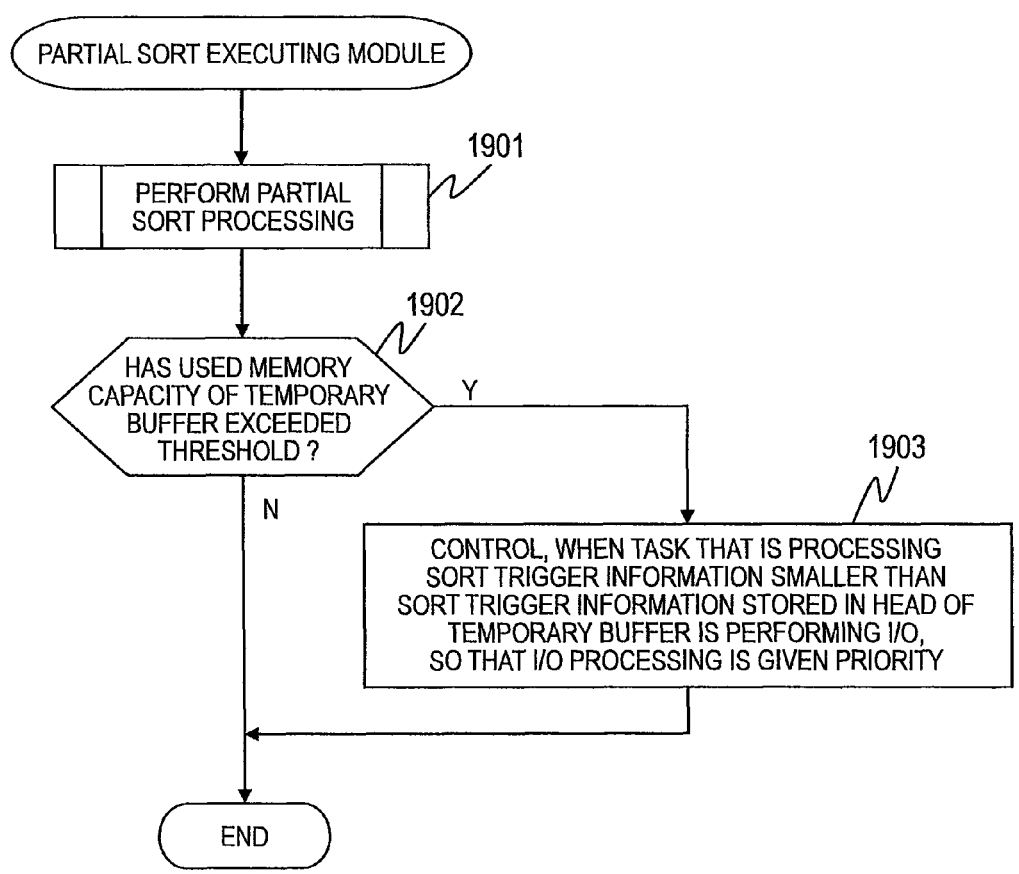
FIG. 21 is a diagram illustrating task management information that is managed by a task management module according to a fourth embodiment of this invention.
FIG. 22 is a flow chart illustrating steps of controlling priority of input/output processing of a task based on how much capacity is used by a temporary buffer after partial sorting is executed according to the fourth embodiment of this invention.

FIG. 21 illustrates task management information that is managed by the task management module 143 according to the fourth embodiment of this invention.

Task management information includes information necessary to manage a task, such as the task identifier 1801 by which a task being executed is identified. The task management information according to the fourth embodiment of this invention includes, in addition to a task identifier 1801 and sort trigger information 1802 which are components common to the third and fourth embodiments, a task status 1803 and related information (1804 and 1805) for each task.

The task identifier 1801 and the sort trigger information 1802 are the same as the ones in the third embodiment. The task status 1803 indicates the status of a task and values such as "in execution" and "performing I/O" are set as the task status 1803.

In the fourth embodiment of this invention, when the task status 1803 is "performing I/O", information of an input/output request is stored as the related information. The related information specifically means a file descriptor 1804 and an offset 1805. Information of an input/output request may be a logical unit number and a logical block address.

FIG. 22 is a flow chart illustrating steps of controlling the priority of input/output processing of a task based on how much capacity is used by the temporary buffer after partial sorting is executed according to the fourth embodiment of this invention.

As in the first embodiment, the processor 112 executes partial sort processing upon reception of sort trigger information (Step 1901). After the partial sort processing is finished, the processor 112 determines whether or not the memory capacity used by the temporary buffer 144 exceeds a threshold (Step 1902). In the case where the memory capacity used by the temporary buffer 144 is equal to or smaller than the threshold (the outcome of Step 1902 is "N"), this processing is ended.

On the other hand, in the case where the memory capacity used by the temporary buffer 144 exceeds the threshold (the outcome of Step 1902 is "Y"), the processor 112 controls such that a task necessary to output query results stored in the temporary buffer 144 is processed before other tasks. Specifically, which task is associated with sort trigger information that is smaller than sort trigger information stored at the head of the temporary buffer 144 is identified from the task management information of the task management module 143. In the case where the status of the identified task is "performing I/O", the processor 112 controls such that data input requests associated with this task are fulfilled before other data input requests (Step 1903). The associated data input requests are fulfilled before other data input requests by, for example, issuing the same data input requests to which a high I/O priority level is set.

The threshold memory capacity can be set with the use of the setting window of the database management system management tool that has been described in the third embodiment.

As has been described, according to the fourth embodiment of this invention, a task that is causing an increase in the used memory capacity of the temporary buffer 144 is identified and the identified task can be processed before other tasks by processing data input requests that are issued by the identified task before other data input requests. The capacity used by the temporary buffer 144 is thus reduced and the memory consumption can be kept small.

While the present invention has been described in detail and pictorially in the accompanying drawings, the present invention is not limited to such detail but covers various obvious modifications and equivalent arrangements, which fall within the purview of the appended claims.

What is claimed is:

1. A database processing system, comprising: a computer which outputs all query results in response to query requests received from outside; and a storage system which stores data to be output in accordance with the query requests,
  wherein the computer comprises a first interface, which is coupled to the storage system, a processor, which is coupled to the first interface, and a memory, which is coupled to the processor,
  wherein the storage system comprises a second interface, which is coupled to the computer, a control unit, which is coupled to the second interface, and storage, which is coupled to the control unit,
  wherein the storage stores data and storage location information in which storage locations of the data are recorded in a given order,
  wherein the computer is configured to:
  receive query requests for outputting query results in an order of values recorded in the storage location information;
  create sort trigger information indicating order relations that are specified in the query requests, based on the storage location information; and
  send the plurality of data input requests to the storage system,
  wherein the storage system is configured to send data that is fetched in accordance with the each of the plurality of received data input requests to the computer for each of the plurality of data input requests received from the computer, and
  wherein the computer is configured to:
  store a query result in association with the sort trigger information in the memory, determine, before all of the plurality of data input requests sent are fulfilled, from the sort trigger information whether or not a query result to be output next is found in already fetched partial data stored in the memory, which is only part of the pieces of data to be fetched by the storage system; and
  start, in the case where the data to be output next is found, outputting the query result,
  wherein the sort trigger information is structured such that values hierarchized based on precedence relations of operations in the query plan and corresponding to an access order in which one of the data and the storage location information is accessed are linked together, the values linking one hierarchy level to another,
  wherein the memory includes a temporary buffer, which temporarily holds query results generated from the data that is fetched from the storage system in accordance with the query requests, and
    wherein, in the case where capacity of data stored in the temporary buffer exceeds a first given threshold, the computer is configured to sort the received query results by using a temporary storage space which is allocated to external storage accessible to the computer.

2. The database processing system according to claim 1,
  wherein the computer uses the processor to execute a database management system, which is stored in the memory and which receives the query requests, issues data input requests to the storage system to generate all query results, and outputs the all query results,
  wherein the database management system has a query receiving module, which receives the query requests and creates a query plan as a procedure of generating query results, and a query executing module, which executes the query plan to generate all query results,
  wherein the query plan is constituted of operations in which one of the data and the storage location information is accessed,
  wherein the query executing module includes:
  an operation executing module which executes, for each piece of data, the operations constituting the query plan in parallel, to thereby send the plurality of data input requests for fetching the data to the storage system, and generates query results from the data fetched in response to the plurality of data input requests;
  a sort trigger information attaching module which creates the sort trigger information indicating order relations that are specified in the query requests, based on the storage location information and an order of processing the operations; and
  a partial sort executing module which outputs the query results as instructed by the query requests,
  wherein the operation executing module is configured to output the generated query result and its associated sort trigger information to the partial sort executing module, and output sort trigger information for processing that has been ended without generating a query result to the partial sort executing module, and
  wherein the partial sort executing module is configured to:
  keep, in the memory, output determination information which holds a value of sort trigger information that is to be output next;
  set, as an initial value of the output determination information, a value of sort trigger information that is to be output first;
  receive one of a pair of the query result and the sort trigger information, and the sort trigger information, which is output from the operation executing module, and compare the sort trigger information against the output determination information;
  store, in the case where the sort trigger information and the output determination information do not match, in the temporary buffer a temporary buffer element, which is a pair of the sort trigger information and the query result;
  in the case where the sort trigger information and the output determination information match and the query result that is associated with the sort trigger information is found, output the query result, update the output determination information with a value of sort trigger information that is to be output next, and search the temporary buffer for a temporary buffer element that includes sort trigger information matching the updated output determination information; and
    in the case where the temporary buffer element is found and the temporary buffer element includes a query result, output the query result, update the output determination information with a value of sort trigger information that is to be output next, search the temporary buffer again for a temporary buffer element that includes sort trigger information matching the updated output determination information, and repeat until a temporary buffer element that includes sort trigger information matching the output determination information is no longer found.

3. The database processing system according to claim 2,
  wherein the operation executing module is configured to generate query results by executing operations, for each piece of one of the data and the storage location information independently, through a plurality of tasks that can be run in parallel, wherein the plurality of tasks fetch, from the sort trigger information attaching module, sort trigger information that is associated with one of the data and the storage location information for which operations are being executed, and the query result and the sort trigger information are output in the case where the query result is to be completed, whereas the sort trigger information is output to the partial sort executing module in the case where the plurality of tasks are to be ended without generating the query result, and wherein the sort trigger information includes information that indicates last access on each hierarchy level.

4. The database processing system according to claim 1, wherein the computer is configured to receive setting of the first given threshold.

5. The database processing system according to claim 1, wherein the computer is configured to receive designation of the external storage.

6. The database processing system according to claim 3, wherein the memory stores task management information for managing a task that is being executed by the processor, and wherein the computer is configured to:

select, in the case where the capacity of data stored in the temporary buffer exceeds a second given threshold, from the task management information, a task executed prior to a task that holds sort trigger information to be output before sort trigger information that is held in the temporary buffer; and execute the selected task before executing other tasks that are being executed.

7. The database processing system according to claim 6, wherein the computer is configured to receive setting of the second given threshold.

8. The database processing system according to claim 3, wherein the memory stores task management information for managing a task that is being executed by the processor, and wherein the computer is configured to:

select, in the case where the capacity of data stored in the temporary buffer exceeds a third given threshold, from the task management information, a task executed prior to a task that holds sort trigger information to be output before sort trigger information that is held in the temporary buffer; and reissue data input requests that have been issued in the selected task, at a higher priority level than a priority level of data input requests that are output in other tasks.

9. The database processing system according to claim 8, wherein the computer is configured to receive setting of the third given threshold.

10. A computer which outputs all query results in response to query requests received from outside, the computer comprising:

a first interface coupled via a network to a storage system which stores data to be output in accordance with the query requests;

a processor coupled to the first interface; and a memory coupled to the processor, wherein the storage system comprises a second interface, which is coupled to the computer, a control unit, which is coupled to the second interface, and storage, which is coupled to the control unit, wherein the storage stores data and storage location information in which storage locations of the data are recorded in a given order, wherein the processor is configured to:

receive query requests for outputting query results in an order of values recorded in the storage location information;

create sort trigger information indicating order relations that are specified in the query requests, based on the storage location information;

send the plurality of data input requests to the storage system via the first interface;

receive, from the storage system via the first interface, data that is fetched from among the data stored in the storage system in accordance with each of the plurality of data input requests which are received from the computer;

store a query result in association with the sort trigger information in the memory;

determine, before all of the plurality of data input requests sent are fulfilled, from the trigger information whether or not a query result to be output next is found in already fetched partial data stored in the memory, which is only part of the pieces of data to be fetched by the storage system; and start, in the case where the data to be output next is found, outputting the query result, wherein the sort trigger information is structured such that values hierarchized based on precedence relations of operations in the query plan and corresponding to an access order in which one of the data and the storage location information is accessed are linked together, the values linking one hierarchy level to another, wherein the memory includes a temporary buffer, which temporarily holds query results generated from the data that is fetched from the storage system in accordance with the query requests, wherein the memory stores task management information for managing a task that is being executed by the processor, and wherein the processor is configured to:

select, in the case where capacity of data stored in the temporary buffer exceeds a given threshold, from the task management information, a task that holds sort trigger information to be output before sort trigger information that is held in the temporary buffer; and reissue data input requests that have been issued in the selected task, at a higher priority level than a priority level of data input requests that are output in other tasks.

11. The computer according to claim 10, wherein the processor executes a database management system, which is stored in the memory and which receives the query requests, issues data input requests to the storage system to generate all query results, and outputs the all query results, wherein the database management system includes a query receiving module, which receives the query requests and creates a query plan as a procedure of generating query results, and a query executing module, which executes the query plan to generate all query results, wherein the query plan is constituted of operations in which one of the data and the storage location information is accessed, wherein the query executing module includes:

an operation executing module which executes, for each piece of data, the operations constituting the query plan in parallel, to thereby send the plurality of data input requests for fetching the data to the storage system, and generates query results from the data fetched in response to the plurality of data input requests;

a sort trigger information attaching module which creates the sort trigger information indicating order relations that are specified in the query requests, based on the storage location information and an order of processing the operations; and a partial sort executing module which outputs the query results as instructed by the query requests, wherein the operation executing module outputs the generated query result and its associated sort trigger information to the partial sort executing module, and outputs sort trigger information for processing that has been ended without generating a query result to the partial sort executing module, and wherein the partial sort executing module is configured to:

keep, in the memory, output determination information which holds a value of sort trigger information that is to be output next;

set, as an initial value of the output determination information, a value of sort trigger information that is to be output first;

receive one of a pair of the query result and the sort trigger information, and the sort trigger information, which is output from the operation executing module, and compare the sort trigger information against the output determination information;

store, in the case where the sort trigger information and the output determination information do not match, in the temporary buffer a temporary buffer element, which is a pair of the sort trigger information and the query result;

in the case where the sort trigger information and the output determination information match and the query result that is associated with the sort trigger information is found, output the query result, update the output determination information with a value of sort trigger information that is to be output next, and search the temporary buffer for a temporary buffer element that includes sort trigger information matching the updated output determination information; and in the case where the temporary buffer element is found and the temporary buffer element includes a query result, output the query result, update the output determination information with a value of sort trigger information that is to be output next, search the temporary buffer again for a temporary buffer element that includes sort trigger information matching the updated output determination information, and repeat until a temporary buffer element that includes sort trigger information matching the output determination information is no longer found.

12. The computer according to claim 11, wherein the operation executing module is configured to generate query results by executing operations, for each piece of one of the data and the storage location information independently, through a plurality of tasks that can be run in parallel, wherein the plurality of tasks fetch, from the sort trigger information attaching module, sort trigger information that is associated with one of the data and the storage location information for which operations are being executed, and the query result and the sort trigger information are output in the case where the query result is to be completed, whereas the sort trigger information is output to the partial sort executing module in the case where the plurality of tasks are to be ended without generating the query result, and wherein the sort trigger information includes information that indicates last access on each hierarchy level.

13. A database processing method for a system having a computer, which outputs all query results in response to query requests received from outside, and a storage system, which stores data to be output in accordance with the query requests, the database processing method including the steps of:

receiving, by the computer, query requests for outputting query results in an order of values recorded in storage location information in which storage locations of the data are recorded in a given order;

creating, by the computer, sort trigger information indicating order relations that are specified in the query requests, based on the storage location information;

sending, by the computer, the plurality of data input requests to the storage system;

sending, by the storage system, for each of the plurality of data input requests received from the computer, data that is fetched in accordance with the received plurality of data input request to the computer;

storing, by the computer, a query result in association with the sort trigger information in a memory;

determining, by the computer, before all of the plurality of data input requests sent are fulfilled, from the sort trigger information whether or not a query result to be output next is found in already fetched partial data stored in the memory, which is only part of the pieces of data to be fetched by the storage system; and starting, by the computer, in the case where the data to be output next is found, outputting the query result, wherein the sort trigger information is structured such that values hierarchized based on precedence relations of operations in the query plan and corresponding to an access order in which one of the data and the storage location information is accessed are linked together, the values linking one hierarchy level to another, wherein the memory includes a temporary buffer, which temporarily holds query results generated from the data that is fetched from the storage system in accordance with the query requests, and wherein, in the case where capacity of data stored in the temporary buffer exceeds a first given threshold, the computer is configured to sort the received query results by using a temporary storage space which is allocated to external storage accessible to the computer.

* * * * *